United States Patent [19]

Evans et al.

[11] Patent Number: 4,591,402
[45] Date of Patent: May 27, 1986

[54] APPARATUS AND METHOD FOR MANUFACTURING COMPOSITE STRUCTURES

[75] Inventors: Charles B. Evans; William J. Murray, both of Arlington, Tex.

[73] Assignee: LTV Aerospace and Defense Company, Dallas, Tex.

[21] Appl. No.: 511,441

[22] Filed: Jul. 5, 1983

Related U.S. Application Data

[63] Continuation of Ser. No. 276,441, Jun. 22, 1981, abandoned.

[51] Int. Cl.⁴ ............................................. B26D 5/00
[52] U.S. Cl. .................................. 156/350; 156/353; 156/517; 156/523; 156/540; 156/574
[58] Field of Search ............... 156/350, 361, 353, 521, 156/522, 504, 523, 540–541, 152, 247, 249, 344, 574, 517; 83/71

[56] References Cited

U.S. PATENT DOCUMENTS

| | | | |
|---|---|---|---|
| 3,577,297 | 5/1971 | Howard | 156/522 X |
| 3,775,219 | 11/1973 | Karlson et al. | 156/363 |
| 3,810,805 | 5/1974 | Goldsworthy | 156/361 |
| 3,848,501 | 11/1974 | Kutz | 83/471.3 X |
| 3,970,831 | 7/1976 | Hegyi | 156/363 X |
| 4,078,195 | 3/1978 | Mathias et al. | 318/561 |
| 4,214,933 | 7/1980 | Off et al. | 156/510 X |
| 4,285,752 | 8/1981 | Higgins | 156/522 X |
| 4,292,108 | 9/1981 | Weiss et al. | 156/353 X |

Primary Examiner—David Simmons
Attorney, Agent, or Firm—J. M. Cate; S. S. Sadacca

[57] ABSTRACT

An apparatus for forming composite, fiber/resin components with fibrous, resin-impregnated tape is disclosed. The apparatus employs a gantry for positioning a tape dispensing head assembly over a mold structure, which defines a mold surface of planar or contoured configuration. A control system is employed having sensing devices for generating signals indicative of relative positions of components of the apparatus in several axes of permissible movement, and tape application is effected by means of major and secondary command inputs to appropriate servomotor devices. Primary and initial movement is controlled in accordance with a sequence command program in cooperation with a resident program in a digital computer, and a second, adaptive control system is alternatively employed for enabling the tape dispensing head to follow vertical contours of the mold surface during X-Y movement across the surface.

33 Claims, 28 Drawing Figures

APPARATUS AND METHOD FOR MANUFACTURING COMPOSITE STRUCTURES

This application is continuation of Ser. No. 276,441 filed June 22, 1981, now abandoned.

This invention relates to apparatus and methods for manufacturing laminated composite structures and, more particularly, to apparatus and method for manufacturing composite structures with layers of composite tape.

Laminated composite structures are currently employed in a variety of applications in which their light weight, high strength, and other physical characteristics are of benefit. In recent years there has been an increasing interest in the use of composite structures in place of metal components of aircraft, ground vehicles, and structural members in which a high strength-to-weight ratio is of importance. Because of fuel conservation considerations, for example, the use of composite components of vehicles and aircraft is increasing, and, in fact, major portions of automobile bodies and aircraft components have been constructed of composites. Typically, such composite structures comprise a plastic matrix, of a material such as an epoxy, reinforced with a fibrous cloth or tape of a material such as boron, graphite or Fiberglas. The present invention relates to the manufacture of such composites by tape laying procedures, i.e., the manufacture of such structures by the placement on a mold of successive layers of resin-impregnated tapes.

In many applications, structural members are required to sustain greater loads at particular locations and along particular axes than at other locations or axes. The tape lay-up process is used advantageously to form such structures because the tapes can be oriented to provide maximum strength at the locations and along the axes of greatest stress, thus reducing the weight of the structure by permitting the use of less material in areas not subject to such concentrated loads. The tapes have substantially unidirectional filaments impregnated with an uncured or partially cured resin and are generally adhered to a mold surface as parallel, mutually adjacent lengths or strips. The strips of tape of successive layers advantageously extend in differing directions. Successive layers are laid over the mold area until a desired thickness is attained, after which the workpiece is cured to form a composite structure having reinforcing fibers extending in appropriate directions for sustaining the loads anticipated for the particular structure.

While the advantages of such tape laying methods are known, several limitations and difficulties have in the past tended to restrict their general use. One limitation has been the relatively high cost of certain of the manufacturing procedures. The high strength and high modulous of induced rigidity of tapes of graphite fibers, for example, make the tapes difficult to handle and difficult to cut from a spool in desired lengths. In addition, the uncured resin tends to adhere to cutting and transporting mechanisms, and resin tends to build up upon such surfaces, hindering efficient handling and cutting of the tape. In less sophisticated systems, it may be necessary to cut the tapes manually after each pass of a tape-laying head over the mold surface. Even in more elaborate, automated systems, it may be necessary to perform a number of processing steps. In the system disclosed in U.S. Pat. No. 4,133,711, for example, respective layers of tape are individually laid to form a workpiece, which is transferred to a cutting area by a transfer gantry, cut into a desired pattern by a directionable laser, supported on a cutting gantry, and transferred to a mold. In tape-laying systems such as that disclosed in U.S. Pat. No. 3,775,219, a photoelectric edge-sensing mechanism is employed for controlling cutting of the composite lay-up, and adjustment of the edge sensing mechanism is required. Cutting of the tape in certain tape-laying heads entails separating the fibrous tape from a backing strip, cutting the fibrous tape, then readhering the fibrous tape to the backing strip prior to laying the tape on a receiving surface. This necessitates the use of a heat source of an appropriate intensity for softening or plasticizing the tape for readhering it to the backing strip, but of an intensity not so great as to cause premature curing of the tape.

Thus, existing apparatus for automatically forming large composite structures of multiple layers of fibrous tape, cutting and trimming the tape, and subsequently transferring the tape to an autoclave or other curing station have tended to be complex and expensive. The size of such machines adapted to form large aircraft components, for example, necessitates the provision of a massive base for supporting the various components, requiring modification of the supporting foundation in some instances. It has been observed that, when in continuous use, the complexities of such apparatus tend to result in an undesirably large degree of non-productive time entailed in such functions as setting up, adjustment, and maintenance of the machinery, and in the transferring of workpieces between various work stations.

It is, therefore, a major object of the present invention to provide a new and improved apparatus and method for forming laminated composite structures.

A further object is to provide such an apparatus in which only one gantry, extending over the work area, is required, and in which tape laying, cutting, and buildup of a workpiece suitable for curing is accomplished on a single worktable and mold.

Yet another object is to provide such an apparatus which is capable of forming large composite structures and which, nevertheless, does not require a massive base structure for supporting the mold, tape-laying head, and supporting gantries in mutual alignment.

A still further objective is to provide such an apparatus in which the tape-laying head does not require the separation of a backing tape from a fibrous composite tape and the reapplication, by heating means, of the composite tape to the backing tape subsequent to cutting the fibrous tape.

Still another object is to provide a method of forming laminated composite structures in which trimming of the workpiece after lay-up is minimized or eliminated.

Another object is to provide such a method in which the workpiece need not be removed from the forming mold until after curing of the composite structure.

A further object is to provide an apparatus having the above-stated advantages which is at the same time of reliable, practicable construction, and of lower cost of manufacture and installation than prior-art systems of comparable capacity.

Other objects and advantages will be apparent from the specification and claims and from the accompanying drawing illustrative of the invention.

Figure 1:
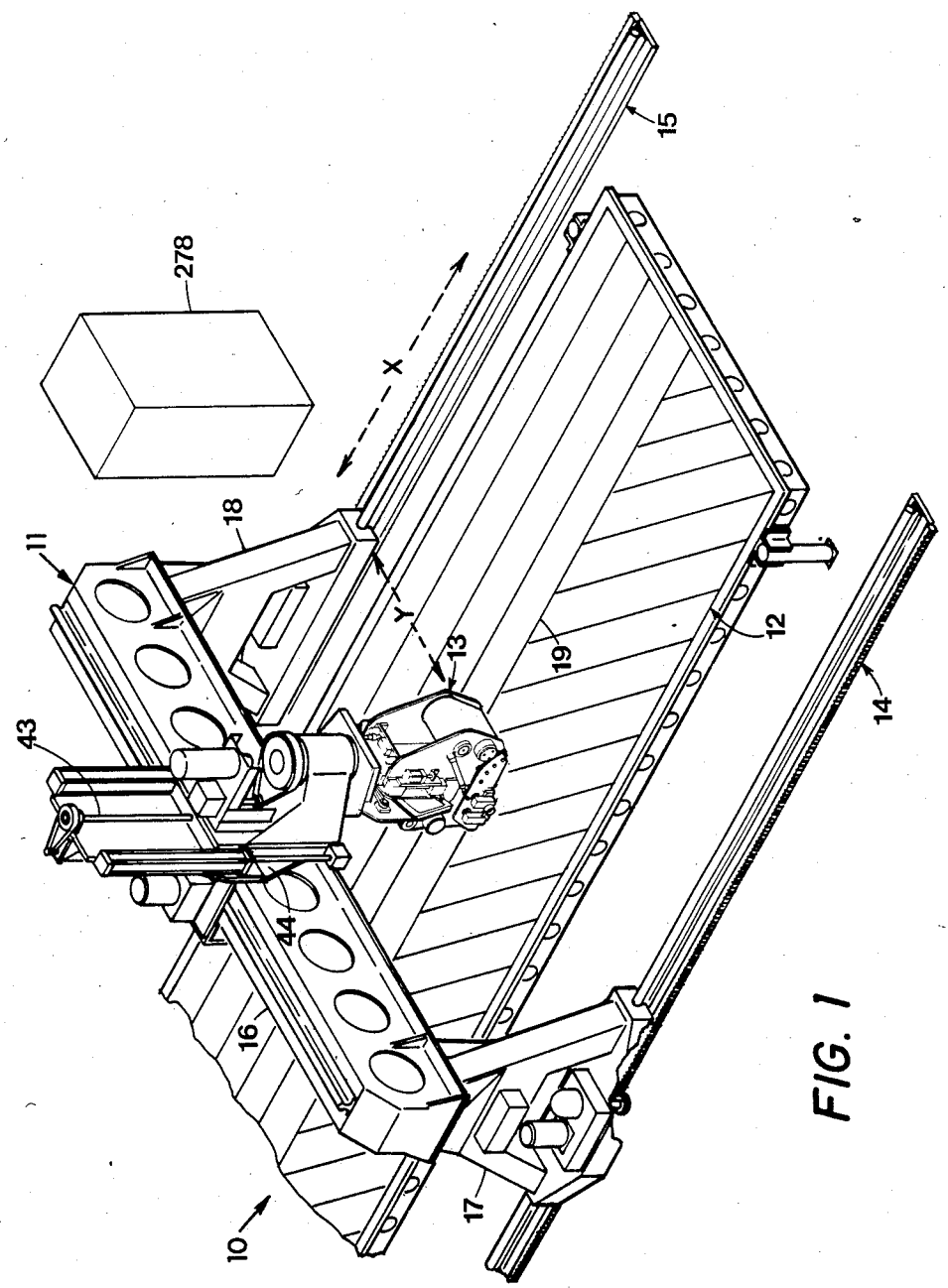
FIG. 1 is a perspective view of the tape laying machine.
Figure 2:
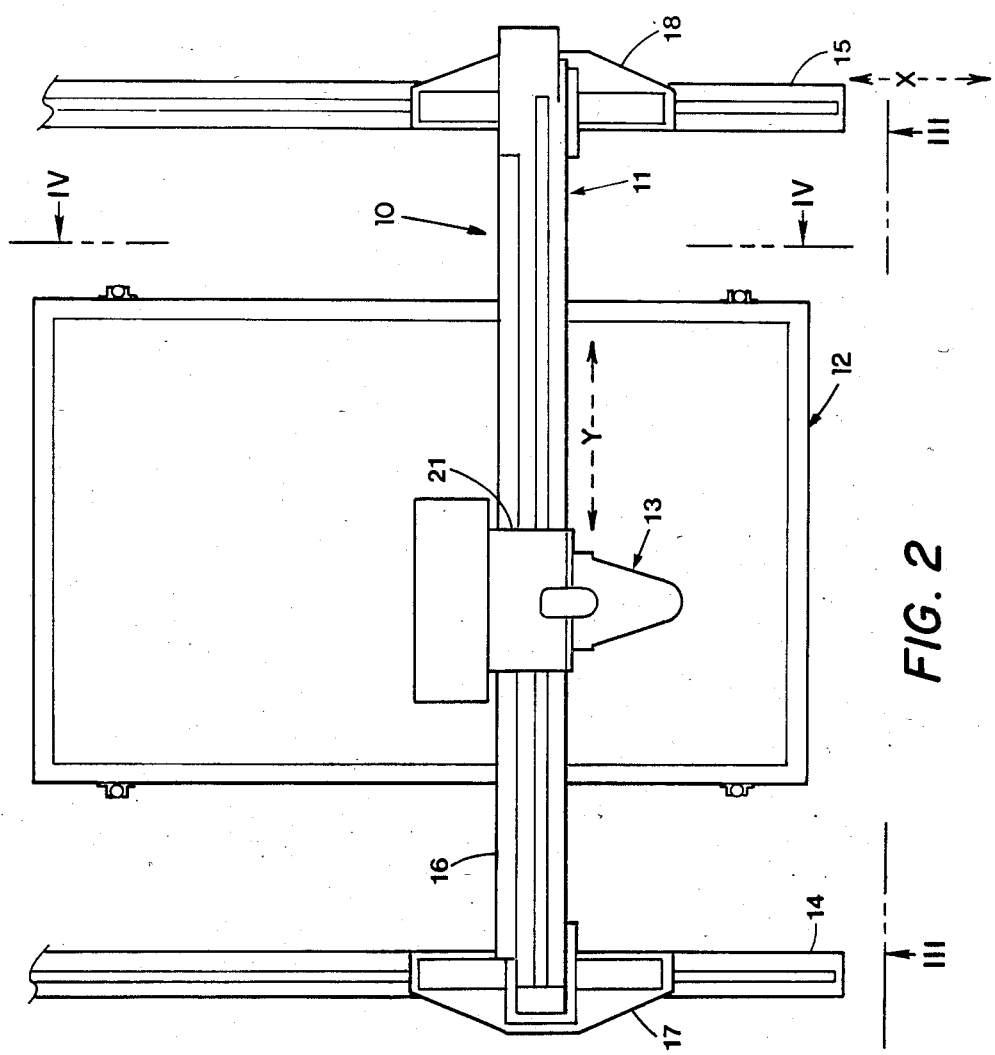
FIG. 2 is a plan view of the tape laying machine of FIG. 1 showing the mold table positioned between the X-axis tracks.

Referring to FIGS. 1 and 2, the tape laying machine 10 includes a gantry 11 extending over a mold or work table 12, the gantry having means, to be described, movably supporting a tape laying head assembly 13. First and second tracks or ways 14, 15 are positioned in mutually parallel alignment extending perpendicularly of the gantry 11 on either side of the work table 12. Movement of the tape laying head along the gantry relative to the work table 12 is denoted movement along the "Y-axis," and movement in the direction parallel to the tracks 14, 15 is termed "X-axis" movement. For convenience, the tracks 14, 15 are termed herein the left and right, "X-axis tracks." The gantry 11 includes an elongated beam 16 of generally rectangular cross section supported at its end portions by left and right, gantry pedestals 17, 18 which are movably supported on the tracks 14, 15 by means of internal rollers, not shown, suitably of the type known in the art as Thompson round way rollers, whereby the pedestals may be translated along the X-axis tracks. Movement of the gantry along the X-axis tracks 14, 15 and/or movement of the tape laying head assembly 13 along the gantry beam 16, when the tape laying head assembly 13 is in contact with the work table (or mold surface) 12, results in the dispensing of lengths of the fibrous composite tape 19 from the tape laying head assembly 13, and in the placement and adhering of the tape to the mold surface along a desired X-Y axis, as will be disclosed in the description to follow of the tape head assembly 13.

Figure 3:
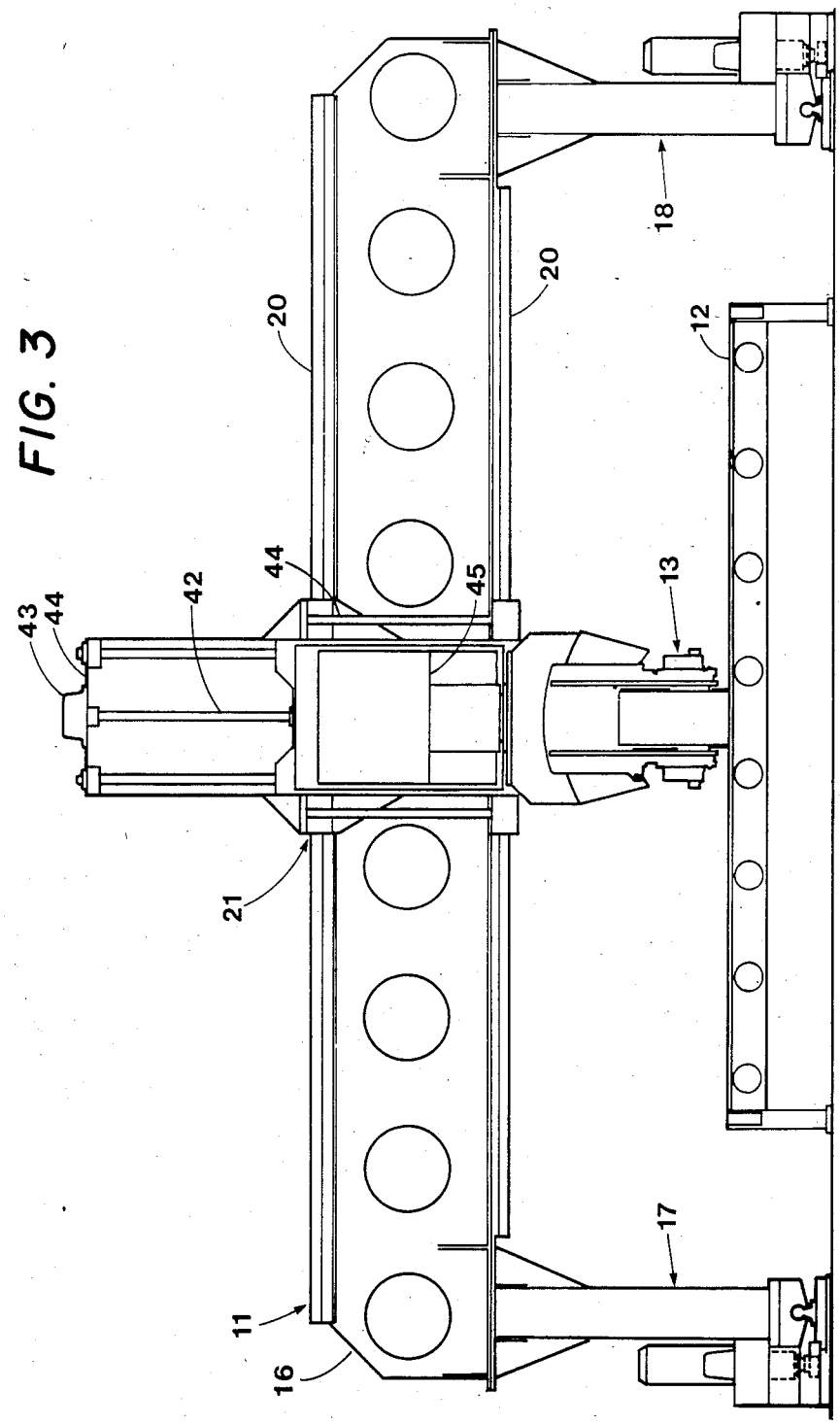
FIG. 3 is an end, elevational view of the tape laying machine taken as on line III—III of FIG. 2.
Figure 4:
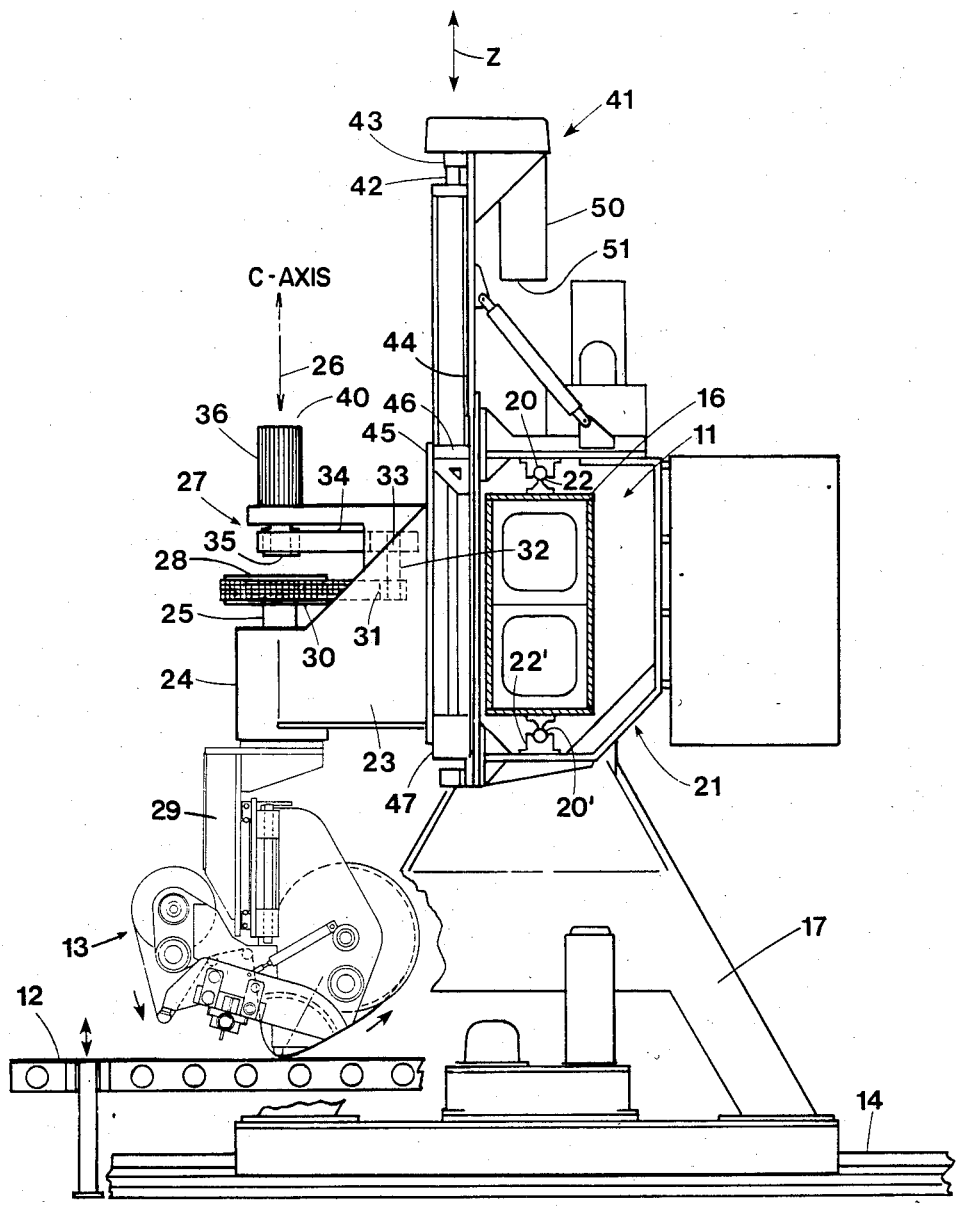
FIG. 4 is a sectional view taken along the axis indicated by the line IV—IV of FIG. 2.

Referring to FIGS. 3 and 4, the gantry beam 16, in the preferred embodiment, includes upper and lower Y-axis tracks 20, 20' extending longitudinally of and mounted on the beam, on its upper and lower sides, respectively. A gantry saddle assembly 21 is provided for mounting the tape head assembly 13 below the gantry beam 16 for permitting movement of the tape head assembly along the gantry beam. As seen most clearly in FIG. 4, the gantry saddle assembly 21 is of generally rectangular cross-section, adapted to receive the gantry beam 16, and includes upper and lower roller assemblies 22, 22' adapted to movably engage the upper and lower Y-axis tracks 20, 20', respectively. The construction of such roller assemblies 22, 22' and tracks 20, 20' is known to those in the art and will not be described in detail herein.

Referring primarily to FIG. 4, the tape laying head 13 is rotatably mounted on the Y-axis saddle assembly by a mounting yoke structure 23 which encloses a dual bearing assembly 24, in which a vertical shaft 25 is rotatably journaled for permitting rotation of the shaft 25 about a substantially vertical axis designated 26, termed herein the "C" axis. (The bearing assembly 24 and shaft 25 are termed the "C-axis" bearing assembly and the "C-axis" shaft, respectively.) A double reduction gear drive system 27 is preferably employed for effecting controlled rotation of the C-axis shaft 25 and tape head assembly 13 about the C-axis. The reduction drive system 27 includes a first timing wheel 28 coaxially mounted and splined to the C-axis shaft 25 and engaging a first timing chain 30, which also engages a second, smaller timing wheel 31 mounted on a vertical shaft 32 rotatably mounted within the yoke structure 23. A third timing wheel 33 is also coaxially affixed to the shaft 32 and engages a second timing chain 34 extending outwardly from the yoke structure 23 to engage a fourth timing wheel 35, smaller than the third timing wheel 33. A C-axis DC drive motor 36 is mounted on an extension of the yoke structure 23 and is drivingly engaged to the fourth timing wheel, for effecting controlled rotation of the tape head assembly 13. A position sensing feedback transducer 40, suitably of a type operable for generating a sine wave signal corresponding to the rotational position of the C-axis shaft, is indexed to and driven by the C-axis drive drive motor 36 for providing an electrical output signal corresponding to the degree of rotation of the motor shaft, whereby the C-axis position of the tape head assembly 13 may be monitored and controlled by control means, to be described.

Figure 5:
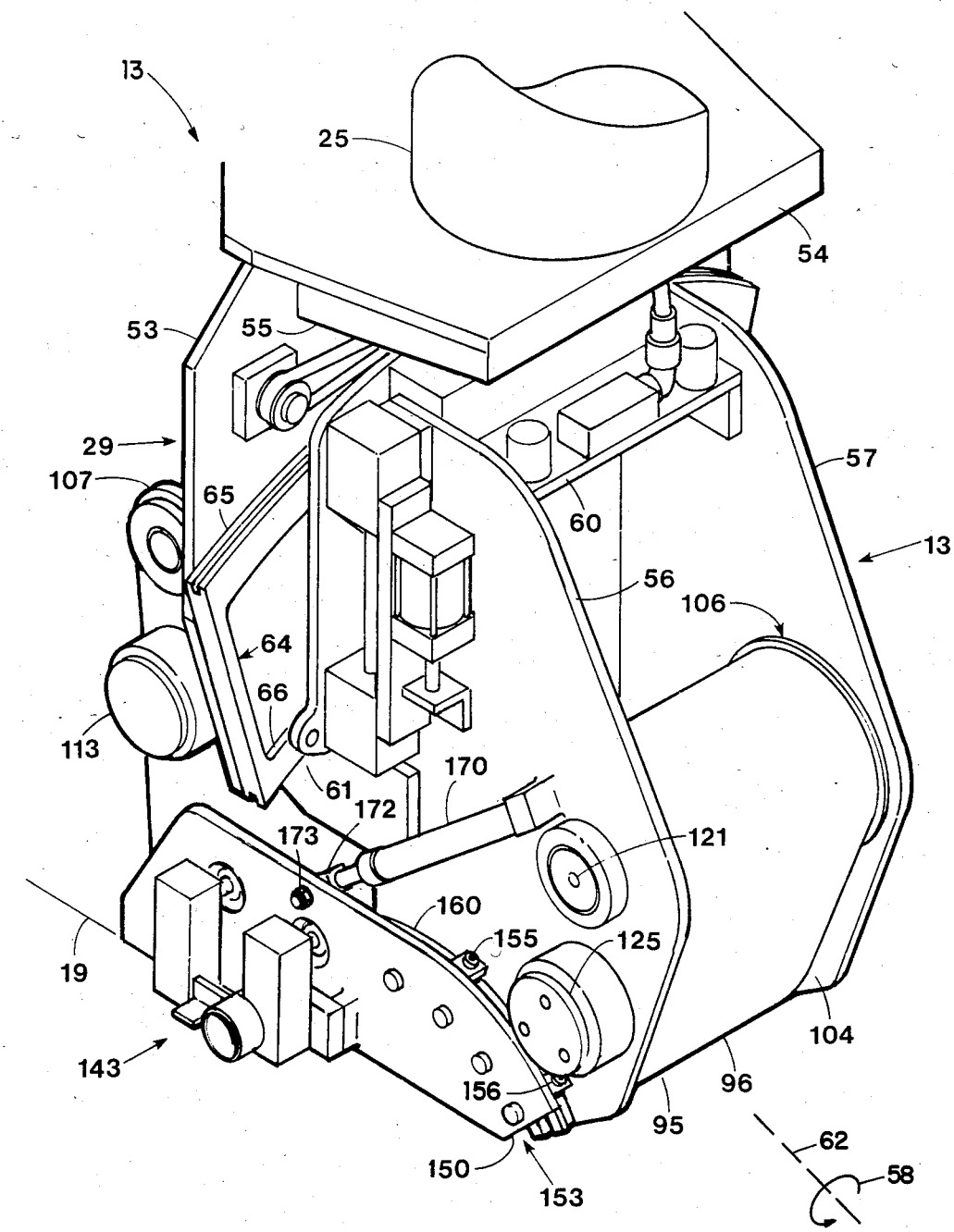
FIG. 5 is a perspective view, in an enlarged scale, of the tape laying head assembly.
Figure 6:
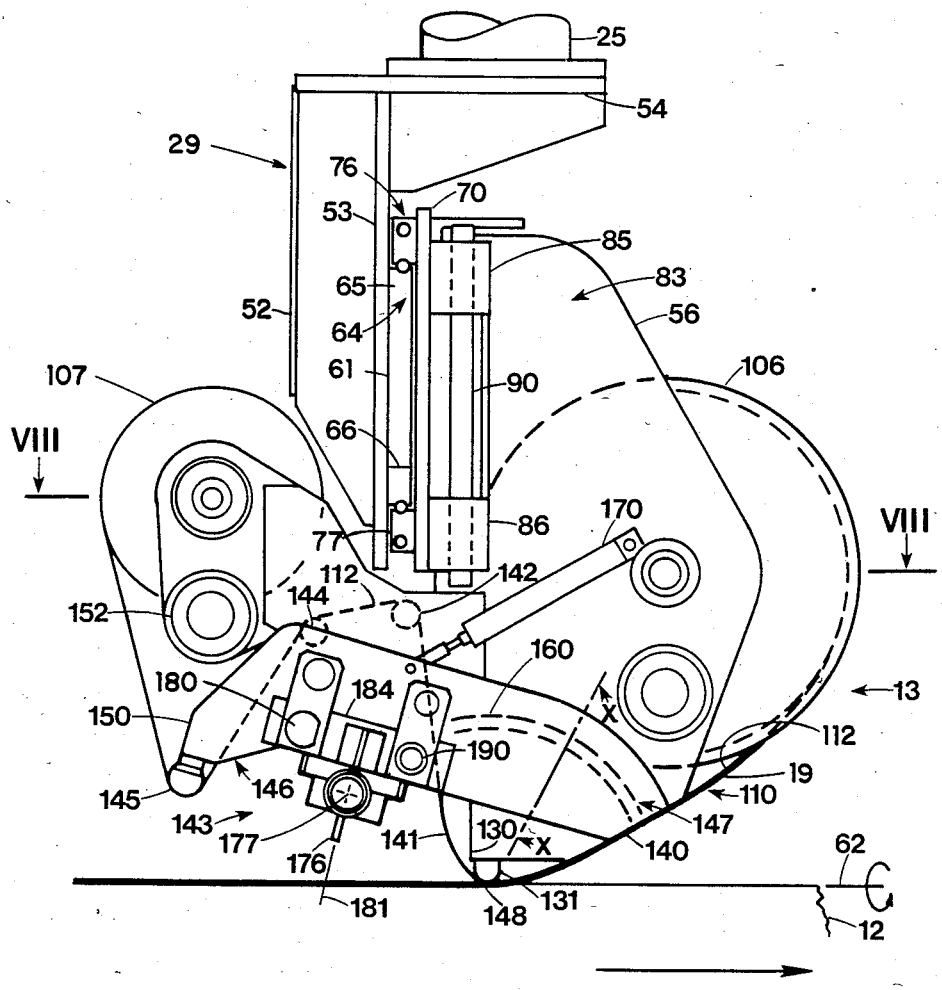
FIG. 6 is a side view of the tape laying head assembly, with portions of the side plate broken away, and with its applicator shoe in the lowered position.

The tape laying head assembly 13 includes a supporting framework 29, shown more clearly in FIGS. 5 and 6, which is non-rotatably connected to and depends from a portion of the C-axis shaft 25 extending downwardly from the C-axis bearing structure 24.

Translation of the tape head assembly 13 vertically, i.e., in the "Z" axis, is accomplished by a Z-axis drive mechanism 41 including a threaded drive shaft 42 (FIGS. 3 and 4) which extends downwardly from bearing support 43 mounted on a vertically extending slide plate 44 affixed to a side portion of the Y-axis saddle 21 and extending upwardly along the Y-axis from the saddle 21, as seen most clearly in FIG. 4. The Z-axis threaded drive shaft 42 extends downwardly within a housing 45, to which the tape head mounting yoke structure 23 is affixed, and the drive shaft is threadingly engaged within corresponding internally threaded block members 46, 47 (FIG. 4) mounted within the Z-axis housing 45. The threaded shaft 42 is driven by timing chains, not shown, engaged with a DC Z-axis servomotor 50, mounted on the Z-axis slide plate 44. A position sensor 51 is mounted on the drive motor 50 for generating position feedback signals corresponding to the degree of rotation of the drive motor 50 and the threaded drive shaft 42. Rotation of the threaded drive shaft 42 within the internally threaded blocks 46, 47 results in vertical movement of the housing 45 upon the shaft 42 and thus, in vertical displacement of the tape laying head assembly 13.

Referring to FIGS. 5 and 6, the tape head supporting framework 29 includes a vertical backplate or stiffback plate 53 extending downwardly from a horizontally extending top plate 54 affixed to the shaft 25, vertical flanges 55 being welded or otherwise affixed to and extending horizontally between the backplate 53 and the top plate 54, and rear flanges 52 extending downwardly along the opposite or rear side surface of the backplate, for reinforcing the framework 29. The tape head assembly 13 includes left and right face or side plates 56, 57, rigidly connected in parallel, mutually spaced relation by brackets 60 extending between and bolted to the plates 56, 57. The side plates 56, 57 serve as a supporting frame 58 of the tape head mechanism, to be described.

The tape head assembly 13 is pivotally connected to the back plate 53 by an R-axis mounting assembly 61 (FIG. 5) permitting rotational displacement of the head assembly 13 about an R-axis 62 (FIG. 6). The R-axis 62 is aligned with the tape head assembly 13 and, when the tape head assembly 13 is aligned with the X-axis as shown in FIGS. 1, 2, and 4, extends parallel to the X-axis and centrally intersects the tape head assembly 13 adjacent its lowermost portion, i.e., at its intersection with the mold structure 12. The R-axis mounting assembly 61 includes an R-axis track framework 64 including upper and lower arcuate bars or tracks 65, 66, (shown more clearly in FIGS. 5 and 7) concentric with the R-axis 62. The tape head assembly 13 has a rigid mounting plate 70 (FIG. 6) having upper and lower recirculating ball bearing assemblies 76, 77, adapted to mate with the upper and lower arcuate tracks 65, 66, respectively, for permitting arcuate movement of mounting plate 70 relative to the upper and lower tracks 65, 66 and thereby permitting arcuate movement about the R-axis 62 of the tape head assembly 13.

Figure 7:
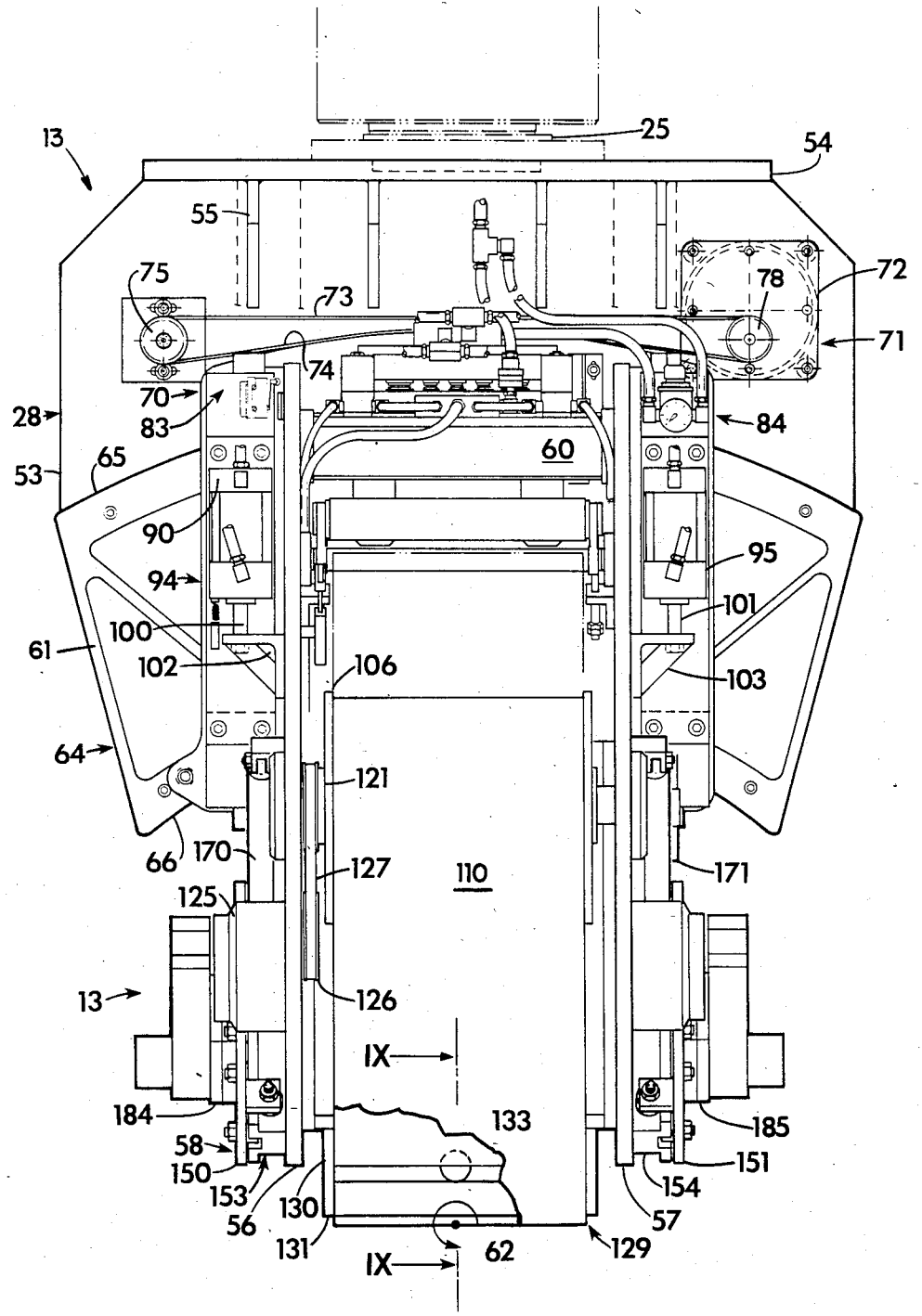
FIG. 7 is a front elevational view of the tape laying head assembly of FIG. 5.

An R-axis drive mechanism 71, FIG. 7, includes a DC servomotor 72 mounted on the backplate 53. An R-axis timing belt 73 connected to a driving pully on the motor 72, extends along the backplate 53 over and in engagement with an arcuate, driven surface 74 of the mounting plate 70, and is looped around a corresponding pulley 75 mounted on the opposite side of the backplate 53 in alignment with the surface 74 and the drive motor 72. Rotation of the drive motor 72 in a clockwise direction, as viewed in FIG. 7, causes leftward movement of the lower section of the timing belt 73 and thereby affects counterclockwise arcuate movement of the mounting plate 70 and tape head assembly 13, upon the upper and lower tracks 65, 66.

Figure 8:
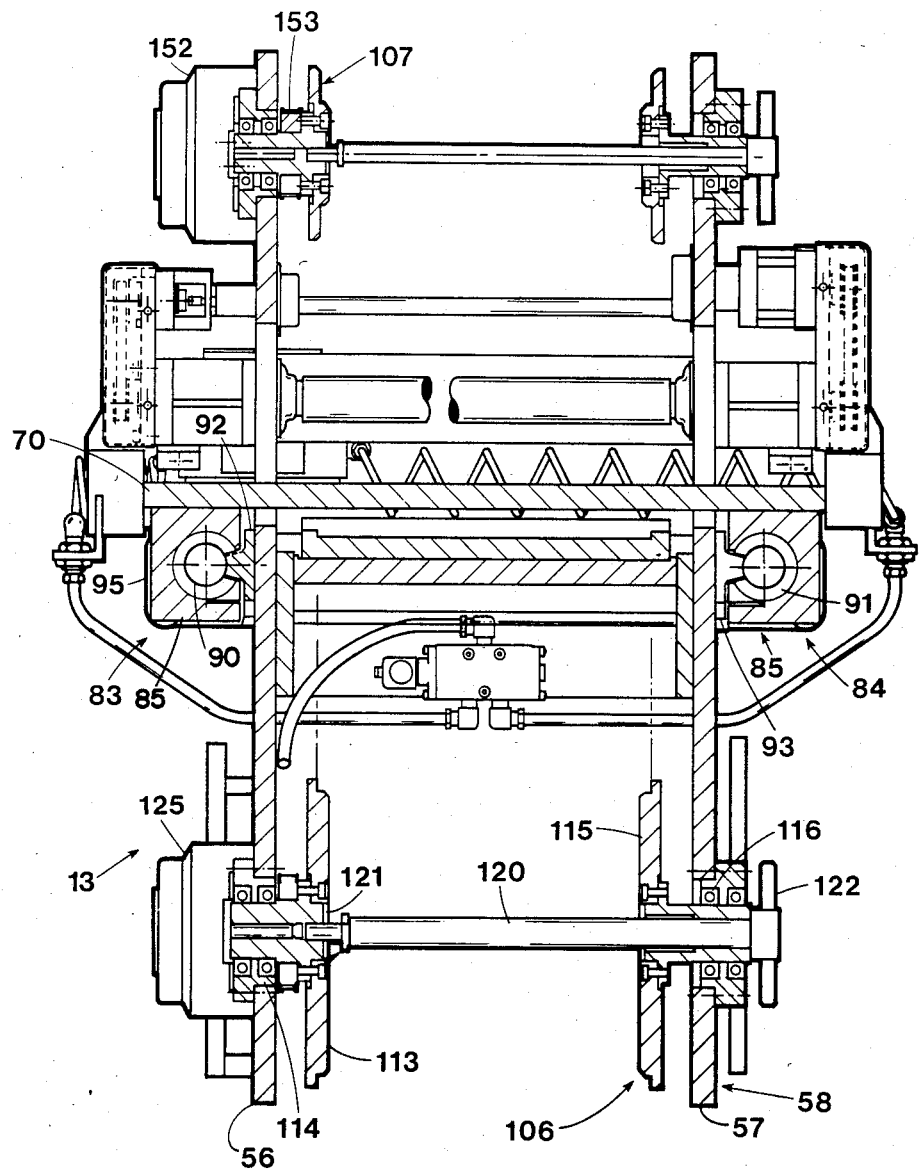
FIG. 8 is a sectional view taken as on line VIII—VIII of FIG. 6.

Referring to FIG. 8, the tape head frame structure 58 is connected to mounting plate 70 by means of left and right, vertical bushing assemblies 83, 84. With additional reference to FIG. 6, the left bushing structure 83 includes upper and lower, recirculating linear ball bushing assemblies 85, 86 which are bolted or otherwise affixed to the mounting plate 70. Referring to FIG. 8, left and right, upper bushing assemblies 85, 85= are movable vertically relative to left and right vertical shafts 90, 91 which are axially movably received within the linear bushing assemblies 85, 85'. As seen in FIG. 8, the bushing assemblies 85, 85' are semi-enclosed, and in cross section have inwardly-facing, vertically extending slots for receiving left and right shaft mounting brackets 92, 93 which are bolted to the left and right shafts 90, 91, respectively. The mounting brackets 92, 93 are also bolted or otherwise affixed to the left and right side plates 56, 57, respectively. In operation, the shafts 90, 91, the mounting brackets 92, 93, and the tape head framework 58 are thus movable vertically relative to the mounting plate 70, by vertical movement of the shafts 90, 91 within the bushing assemblies, for accommodating minor vertical movements of the tape head 13.

With reference to FIG. 7, left and right pneumatic actuators 94, 95 are connected to the left and right bushing structures 83, 84, and extend downwardly alongside the left and right side plates 56, 57. Respective, left and right actuator rods 100, 101, are connected to side plates 56, 57 by means of brackets mounted to the rods and affixed to the left and right side plates. Air under pressure is applied to the lower chambers of actuators 94, 95, during operation which tends to counterbalance, or exert an upward force, on the tape head assembly 13 for controlling the pressure of the head assembly 13 upon the mold surface 12. Servocontrol means are provided for sensing the vertical position of the tape head frame 58 relative to the mounting plate 70 and for actuating the Z-axis drive motor 50 to raise or lower the tape head 13 and mounting yoke 23, to maintain the actuator rods 100, 101 approximately centered within their range of movement within the actuators 94, 95. The actuators 94, 95 and associated components thus comprise a means for controlling the degree of pressure exerted upon the tape 110 by opposing, to a predetermined degree, the downward force produced by the weight of the tape head assembly 13.

A tape feed reel 106 is rotatably mounted between the side plates 56, 57 on what is normally the forward or advancing end of the head assembly 13. Referring additionally to FIG. 6, a take-up reel 107 is mounted to the rear of the tape head assembly 13. The composite tape structure 110 contained in the feed reel 106 comprises the pre-impregnated fibrous tape 19 and a backing strip 112. The fibrous tape 19 (FIG. 6A), for example, is a tape of suitable width formed of unidirectional graphite fibers, impregnated with an uncured epoxy resin. The backing strip 112, for example, may suitably be of waxed paper of 60-80 pounds per square feet. The tape structure is suitably formed on cardboard spools, not shown.

Referring to FIG. 8, the supply reel 106 consists of a fixed hub assembly 113 rotatably mounted adjacent the left side plate 56 by left bearing assembly 114. An axially movable hub assembly 115 is rotatably mounted adjacent the right side plate 57 by bearings 116. An axle 120 is rotatably seated within bearings 116 and 114 slideably fitted through the hub assembly 115, and is threadingly engaged within a left cylindrical hub bushing 121 which is rotatable within bearing assembly 114 relative to the left side plate 56. The axle 120 extends coaxially through and non-rotatably receives the hub 113. A handle 122 is suitably provided, connected to a portion of the axle 120 extending through bearing 116 beyond the right side plate 57, for permitting manual rotation of the axle 120 for threadingly engaging the opposite end of the axle 120 within corresponding threads formed in the hub bushing 121. Rotation of the shaft 120 within the bushing 121 in a clockwise direction displaces the axle 120 axially toward the left plate 56 and draws or pulls the movable hub 115 leftwardly within the bearing structure 116, thus urging the hubs 113, 115 toward each other to compress and rigidly engage the roll of tape 110 (FIG. 6) mounted on the feed roller 106.

A drive motor 125 (FIG. 5) is mounted on the left side plate 56 below the bearing assembly 114 (FIG. 8) and hub bushing 121. With added reference to FIG. 7, the shaft of motor 125 extends within and is non-rotatably connected to a drive pulley 126 which engages a drive belt 127, also engaging a pulley mounted on the hub bushing 121, whereby rotation of the motor 125 effects axial rotation of the axle 120 and the hubs 113, 115.

Figure 9:
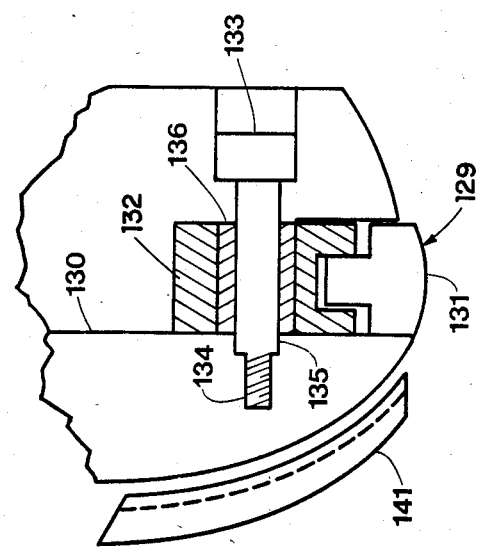
FIG. 9 is a cross-sectional view of the primary applicator shoe assembly taken as on line IX—IX of FIG. 7.

Referring again to FIG. 7, a main applicator shoe assembly 129 is mounted between the side plates 56, 57, at their lowermost, forward portions upon a mounting frame support 130 connected between the side plates. With added reference to FIG. 9, the applicator shoe assembly includes an applicator shoe 131, comprising a low friction insert of a material such as Teflon, having an arcuate, convex lower cross-sectional surface, the shoe 131 being vertically slideable within a shoe mounting block 132 suitably of aluminum. The mounting block 132 is bolted to the frame support 130 by means of a centrally located, horizontally extending bolt 133, bolt 133 having a stepped, threaded end portion 134 of reduced diameter adapted to threadingly engage a corresponding, stepped bore formed within the frame 130, the bolt 133 being seated within the bore against an annular, radially extending seat surface 135, whereby the bolt head is not tightened against the shoe assembly 129 (FIG. 7). The bolt 133 is slideably fitted within a sleeve 136 seated within the mounting block 132, whereby limited rocking movement of the shoe assembly 132 about the bolt 133 is permitted, to accommodate irregularities in the mold surface 12.

Referring additionally to FIG. 6, in operation the tape structure 110, consisting of the fibrous tape 19 (FIG. 6A) and the backing strip 112, is guided toward the lower surface of the main applicator shoe 131 by a guide chute 140 positioned between the side plates 56, 57 (FIG. 8). A similar, rear guide chute 141 is positioned to the rear of the shoe 131 and extends diagonally upwardly and rearwardly therefrom for guiding the backing tape 112 which is separated from the fibrous tape 19 during tape laying operation, as will be described, toward a first guide roller 142 rotatably mounted on and extending between the side plates 56, 57 and positioned over a movable cutting assembly 143, to be described. A second guide roller 144 is also rotatably mounted over the cutter assembly 143 to the rear of the first roller 142, whereby the backing strip 112 may be guided over and around the cutter assembly during tape laying operations. The first and second guide rollers 142, 144 thus comprise a roller bridge assembly permitting positioning of the cutter assembly 143 between the main applicator shoe 131 and a similar, rear applicator shoe 145 which is mounted on a sub-frame assembly 146. The sub-frame assembly 146 comprises left and right plate structures 150, 151 rotatably mounted adjacent the outwardly facing side surfaces of the left and right plate structures 56, 57, respectively, as seen more clearly in FIG. 7, and its construction and function will be described in detail in the following section. To first complete the description of the path of the backing tape 112 as it is taken up upon take-up reel 107, the rear applicator shoe 145 is downwardly directed and positioned below and between the second guide roller 144 and the take-up reel 107. The take-up reel 107, shown in greater detail in FIG. 8, is of a construction similar to that of the supply reel 106 and is driven by a servomotor 152 mounted below the take-up reel 107 and drivingly connected thereto by a timing drive belt 153 engaging pulleys, not shown, connected to the motor 152 and the reel 107, respectively.

In operation, the supply reel 106 is driven in a counterclockwise direction, as viewed in FIG. 6, and the take-up reel 107 is driven in a clockwise direction, by controlled levels of torque sufficient to maintain tension on the tape "sandwich" structure 110 and backing tape 112, and for maintaining the backing tape, as a part of the tape sandwich structure 110, in contact with the main applicator shoe 131, and maintaining the backing tape in contact with the rear applicator shoe 145. Adjustment of the torque is accomplished by initially varying the current applied to the DC servomotors 125 and 152, as will be further described in a later section.

The sub-frame assembly 146 is rotatably mounted on the face plates 56, 57 by means of arcuate bearing structures 147, now to be described, for permitting arcuate movement of the assembly about a horizontal axis 148 (FIG. 6) extending parallel to the lower surface of the main applicator shoe 131. Referring to FIG. 7, left plate structure 150 is rotatably mounted adjacent and in parallel to the left face plate 56 by a left, cam roller bearing assembly 153, and the right plate structure 151 is similarly rotatably mounted on the right face plate 57 by a right cam roller bearing assembly 154.

Referring additionally to FIG. 5, the left rotatable plate structure 150 is rotatably mounted on the left face plate 56 by means of the left cam roller bearing assembly 153, first and second cam follower mounting brackets 155, 156 being affixed to the left plate structure 150 for permitting engagement with an arcuate cam 160 mounted on the outer side of the left face plate 56.

Figure 10:
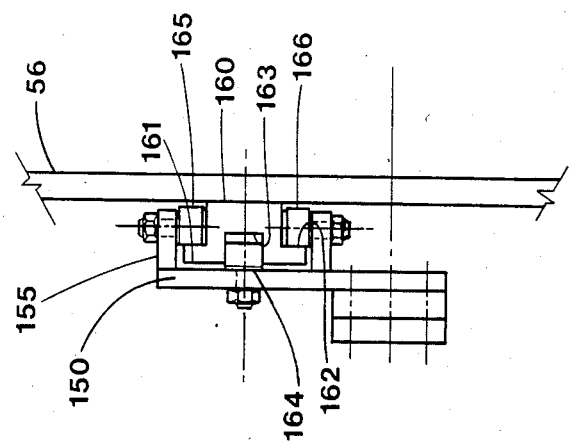
FIG. 10 is fragmentary sectional view of the arcuate cam member.

Referring to FIG. 10, the left plate structure 150, arcuate cam 160, and first cam follower mounting bracket 155 are shown in greater detail. The arcuate cam 160 is of a T-shaped, cross-sectional configuration defining first and second, inwardly facing side cam surfaces 161, 162, and an outwardly open cam slot 163, termed herein the cam guide slot 163. A first, central cam roller 164, rotatably mounted on the plate structure 150 for rotation about an axis perpendicular to the plate 150, engages the slot 163, and second and third cam rollers 165, 166 are positioned beneath and ride against the inwardly facing cam surfaces 161, 162, respectively, and the adjacent, outer surface of face plate 56 for restraining the plate structure 150 from any substantial lateral movement relative to the cam 160.

Figure 6A:
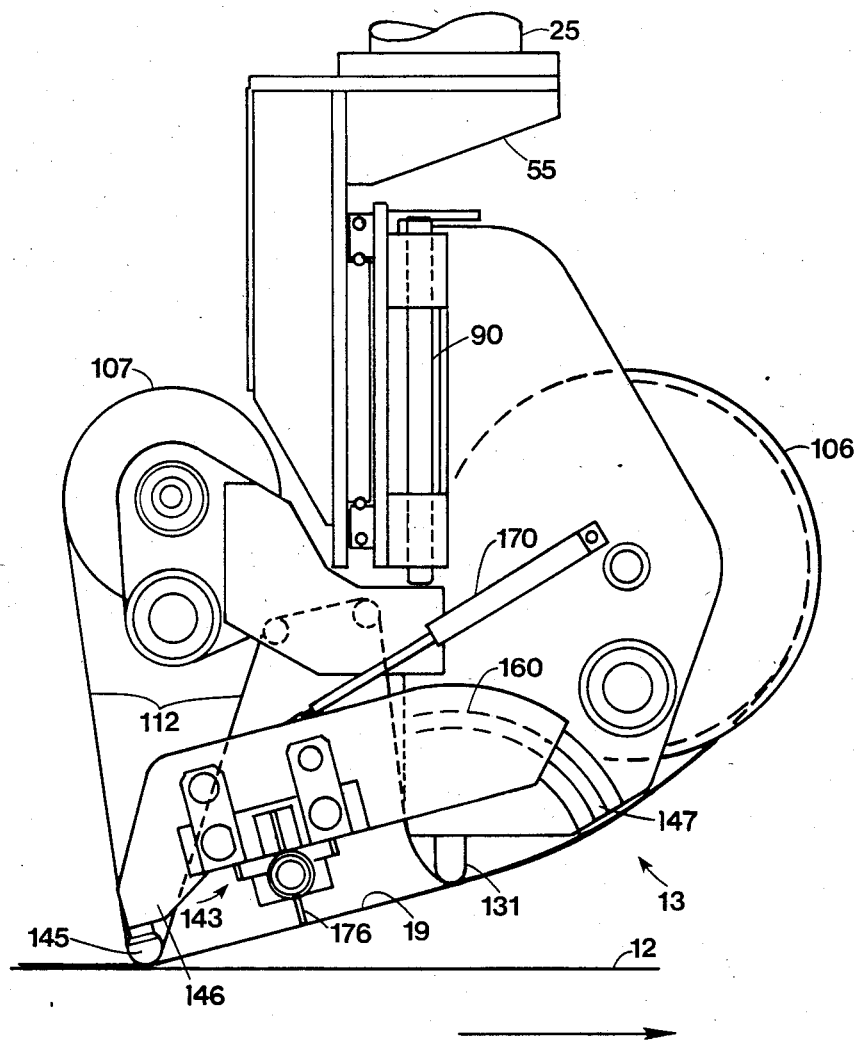
FIG. 6A is a side elevational view of the tape laying head assembly, similar to FIG. 6, with the applicator shoe shown in the raised position.

Referring to FIG. 6, the left plate structure 150 is movable along the arcuate cam 160, in concert with the right plate structure 151, between a first, raised position, shown in FIG. 6, in which it extends diagonally rearwardly and upwardly from the bearing structure 147 and in which the rear applicator shoe 145 is spaced above the mold surface 12, and a second position shown in FIG. 6A, wherein the rear applicator shoe 145 is displaced downwardly relative to the main applicator shoe 131, and wherein the sub-frame structure 146 extends diagonally downwardly from the bearing structure 147.

Left and right positioning actuators 170, 171 (FIG. 7) are pivotally mounted on the left and right face plates 56, 57 respectively, and as shown in FIG. 5 with respect to the left actuator 170, and have actuator rods pivotally connected to the respective adjacent plate structures 150, 151, respectively, by means of suitable clevis eyes 172, which engage bolts 173 fastened through the sub-plates 150, 151. The actuators 170, 171 are disposed substantially tangentially of the arcuate path of movement of the plate structures about axis 148, and serve to displace and position the sub-frame assembly 146 in an arcuate path about axis 148.

Referring to FIGS. 5 and 6, the cutter assembly 143 is mounted on and extends between the left and right plate structures 150, 151 (FIG. 7) and is positioned between the applicator shoes 131, 145 and beneath the guide rollers 142, 144, whereby during arcuate movement of the sub-frame structure 146 about axis 148, the cutter mechanism does not contact the backing strip 112 extending between the applicator shoes 131, 145 and over the guide rollers 142, 144.

As will be more fully understood from the description to follow, the cutter assembly 143 preferably includes a rotatable cutting disc 176 which is spaced from the fibrous tape 19, as shown in FIG. 6, during laying of the tape on the mold surface 12 and which is brought into contact with the tape for cutting the tape upon the frame assembly 146 being rotated to its lowered position, as seen in FIG. 6A. The cutter blade 176, in operation, is caused to move laterally of the tape head 13 along what is termed herein the "W" axis 177 during cutting operations by a W-axis drive shaft 180, and it is angularly directioned about a perpendicularly extending, D-axis 181 when cutting of the tape 19 along a path other than that perpendicular to the tape is required. The cutter assembly 143 is mounted to the plate structure 150 upon a left cutter assembly mounting plate 184 affixed to the left plate structure 150, a corresponding, right mounting plate 185 (FIG. 7) being mounted on the right plate structure 151.

Figure 12:
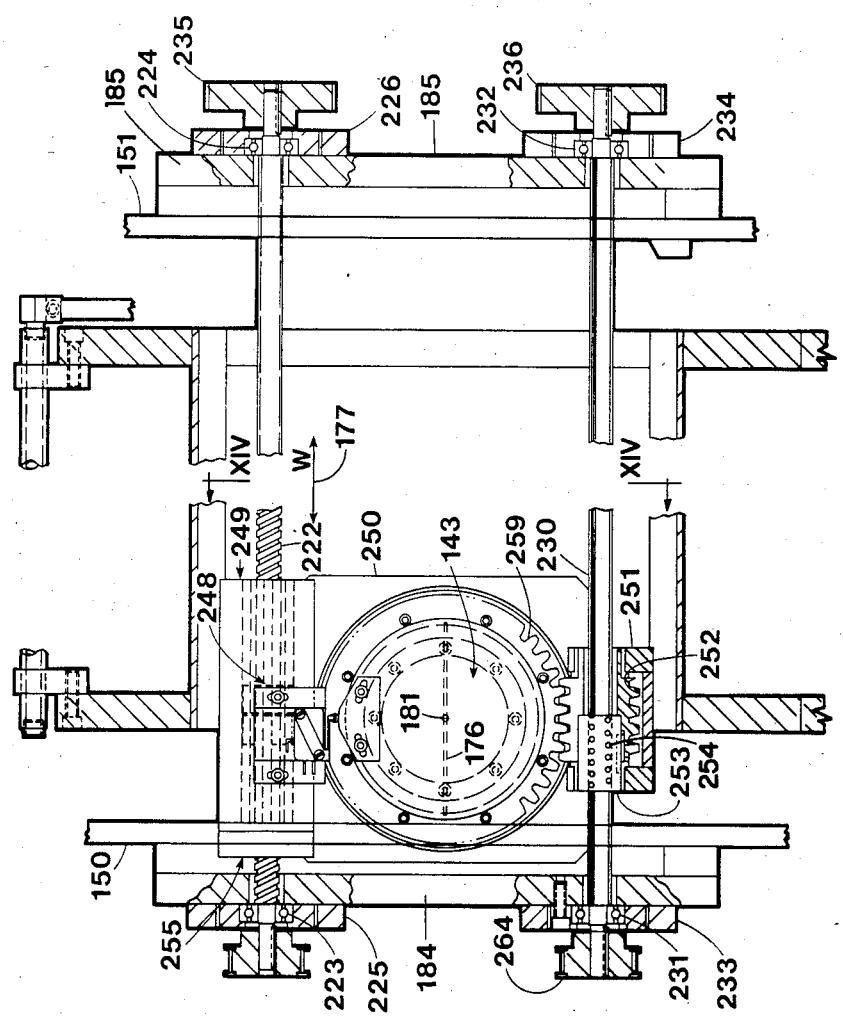
FIG. 12 is a sectional view of the cutter assembly taken as on line XII—XII of FIG. 11.
Figure 13:
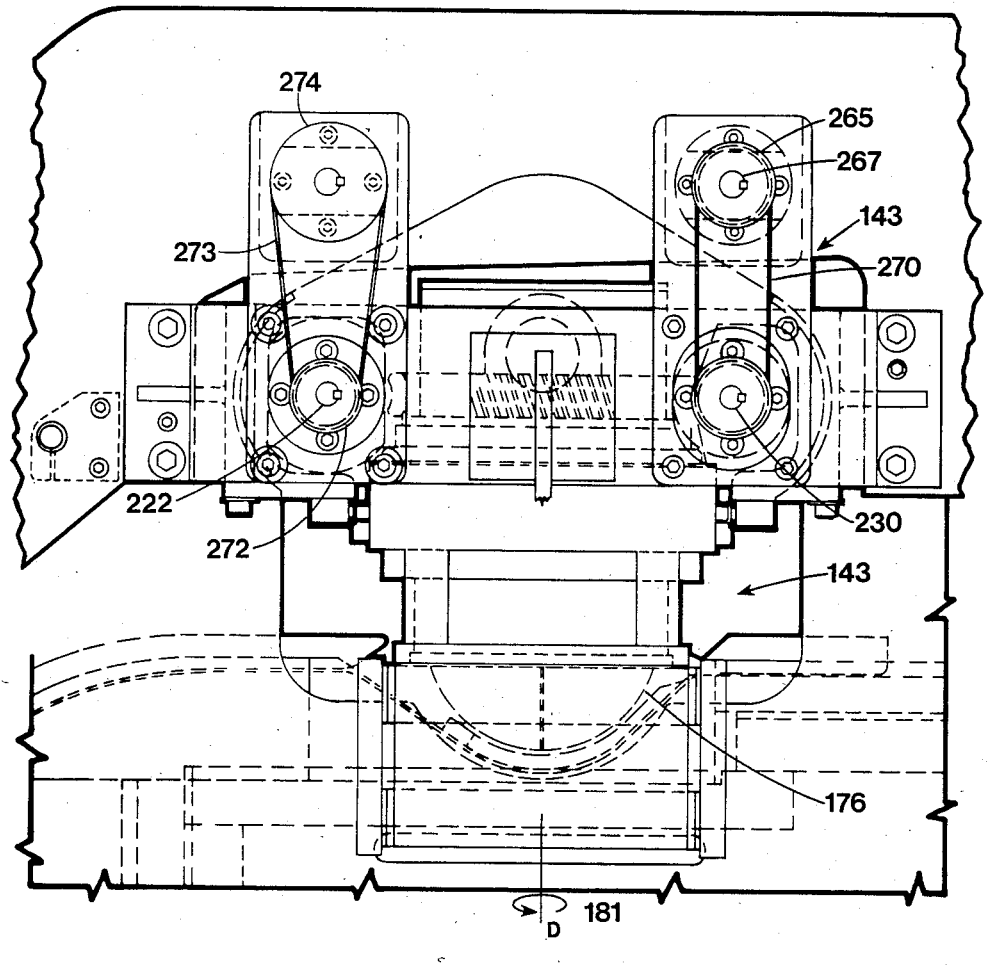
FIG. 13 is an end elevational view of the cutter assembly taken as on line XIII—XIII of FIG. 11.

Referring now to FIG. 12, portions of the cutter assembly 143 are shown mounted on structure, to be described, extending between the left and right cutter assembly mounting plates 184, 185, mounted on the left and right plate structures 150, 151. Referring to FIG. 13, the cutter assembly 143 is shown in greater detail. The rotatable cutter wheel 176 is a circular disc, preferably of a Fiberglas matrix material impregnated with a phenolic within which is dispersed a silicon carbide grit. The disc, in a typical embodiment, is of 0.04-inch thickness.

Figure 14:
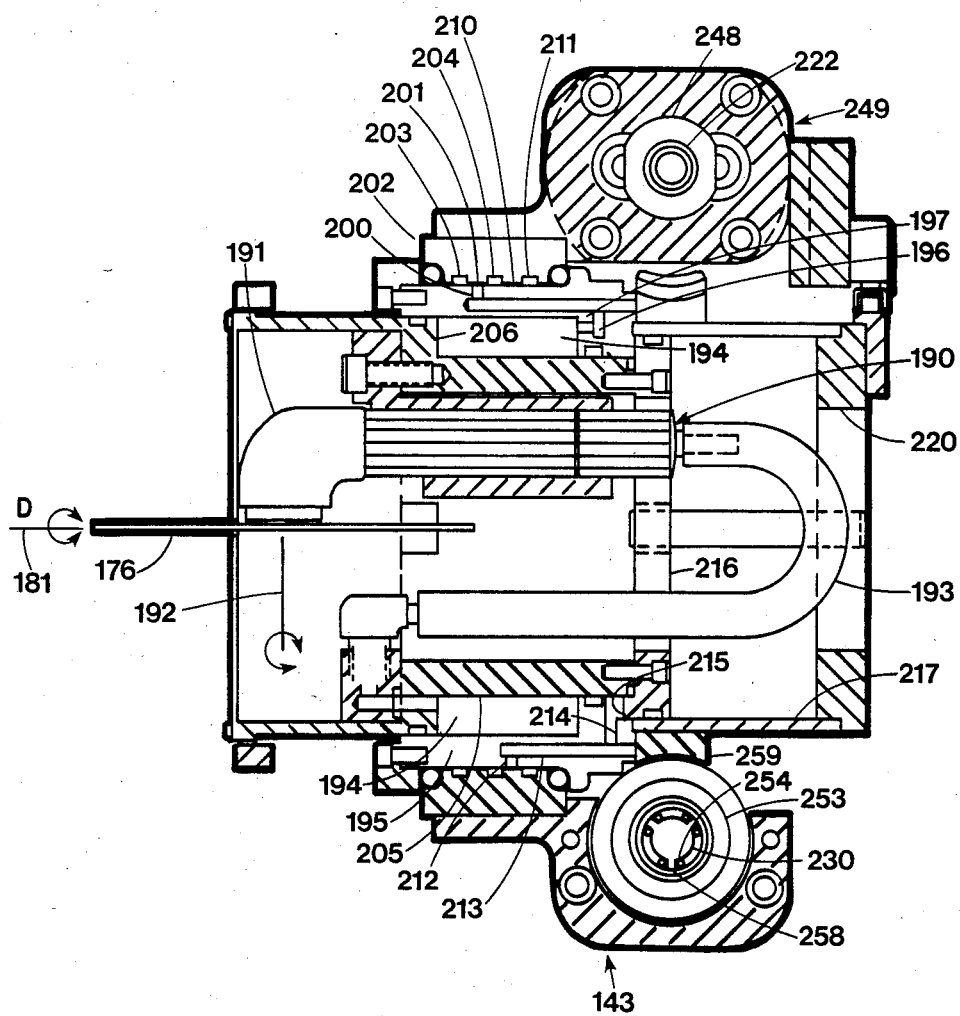
FIG. 14 is a cross-sectional view of the cutter assembly taken as on line XIV-XIV of FIG. 12 and showing the cutter drive assembly.

Referring additionally to FIG. 14, disc 176 is rotatably driven by an air motor 190 drivingly connected to a 90° miter gear box 191 for permitting the disc 176 to rotate upon its axis of rotation 192 perpendicular to the rotational axis of the motor. As shown in phantom lines in FIG. 13, the gear box 191 and disc 176 may be rotated upon the D-axis 181 to a position perpendicular to that shown in solid lines in FIG. 14, or to any intermediate position, as required when other than perpendicular cuts of the tape are entailed. The mechanism for effecting rotation about the D-axis will be described in detail hereinbelow.

The air motor 190 is operable to rotate the disc 176 about the rotational axis 192 at high velocities of, for example, approximately 15,000 rpm. The motor is energized by air under pressure from a source, not shown, conducted through flexible tubing 193 and delivered through an annular cavity 194 formed between an outer, cylindrical housing 195, and an axially movable piston structure 205 slideably and sealingly mounted within the housing 195, the annular cavity 94 communicating with a bore and radially extending passageway system 196, 197, which in turn communicates through a bore 200, extending radially of the housing 195, with an annular channel 201 defined coaxially within a cylindrical manifold block 202 mounted coaxially around the housing 195. The annular channel 201 is defined between first and second O-rings 203, 204 mounted within corresponding annular grooves formed coaxially of the manifold block 202 within the inner, cylindrical surface of the manifold block 202. The channel 201 communicates with a source (not shown) of air under pressure for activating the pneumatic motor 190, and for causing deployment of the annular piston structure 205, upon which are mounted the pneumatic motor 190, gear box 191, and cutter wheel 176. Air under pressure transmitted through the annular channel 201 is conducted through bores 200, 197, and 196 into the chamber 194 defined between the piston structure 205 and the housing 195 and acting upon piston face 206 of piston structure 205, urges the piston structure 205 to its leftward position, as viewed in FIG. 14. This serves to project the cutting wheel 176 beyond the motor housing, for permitting cutting of the adjacent tape, as will be described.

Subsequently, when the cutting wheel 176 is not in operation, air under pressure is conducted into annular channel 210, formed between the second seal 204 and a third seal 211 also mounted coaxially within the manifold block 202. Annular channel 210 communicates with a bore 212 formed radially within the annular housing 195, which in turn communicates through an axially extending bore 213 and radial passageway bore 214 to exert pressure against a piston face 215 defined by an annular plate member 216 bolted to the piston structure 205 and slideably mounted within a second cylinder member 217 coaxial of the housing 195. Pressure on piston face area 215 exerts a force urging the piston assembly 216 to the right, as viewed in FIG. 14, within cylinder 217, thereby retracting the piston structure 205 from its extended position and urging it toward and against an annular, upper wall structure 220 mounted on the rear or upper end of the cylinder 217; i.e., the end opposite the cutter blade 176.

In operation, air pressure is applied through inlet hose 193 to drive the cutter motor 190, and simultaneously applied, through the inlet and through annular channel 201, and bores 200, 197 and 196, to piston face area 206 to urge the motor 190 and cutting disc 176 outwardly to the projected, deployed position as seen in FIG. 14. Upon air pressure being removed from the inlet to the motor 199 and to the inlet communicating with the piston face area 206, the air motor's internal resistance to further rotation rapidly brakes and decelerates the cutting wheel 176, and because of friction and back pressure, air under pressure is conducted through annular channel 210, bores 212 and 213, to piston face 214, urging the piston structure 205, air motor 190, and cutter wheel upwardly to the retracted position, wherein the blade 176 is protected from contact with the tape 19 or mold surface 12. This simultaneous deployment and rotational driving of the blade by pneumatic pressure from a single source of gas under pressure provides important advantages and efficiencies. For example, separate servo control and sensing means are not required for activating and controlling the drive motor and deployment mechanism. Moreover, the use of a conventional air motor in combination with the deployment mechanism effects the high rotational velocities and power levels required to permit cutting of the rather resilient, tacky, adhesive graphite fiber tapes, while at the same time permitting the use of a sufficiently small, light-weight cutter assembly 143 for permitting convenient mounting within the tape laying head assembly 13. More specifically, an equivalent electrical cutter drive motor and independent servomotor for positioning the drive motor and blade would be of such size and weight as to be impracticable for convenient mounting within the cutter head assembly 13 and would add substantial weight to the assembly 13. Moreover, additional electromechanical position feedback and control means would be required to simultaneously drive the cutter wheel motor and deploy the cutter assembly, and to subsequently brake the cutter motor while retracting the cutter assembly.

As the air motor 190 is activated, a corresponding drive system is energized to translate the cutting wheel 176 laterally across the tape 19 for cutting a desired length of tape. As seen more clearly with reference to FIG. 12, an elongated, threaded ball screw drive rod 222, termed herein the W-axis drive shaft, is rotatably mounted within left and right bearing assemblies 223, 224 supported upon left and right bearing assembly support plates 225, 226 mounted on the left and right cutter assembly mounting plates 184, 185, respectively.

A D-axis drive shaft 230 is similarly rotatably mounted in bearing assemblies 231, 232 mounted in left and right bearing assembly support plates 233, 234. A W-axis drive pulley 235 is non-rotatably mounted on the W-axis drive shaft 222, on an extension of shaft 222 beyond the right plate structure 151.

Figure 11:
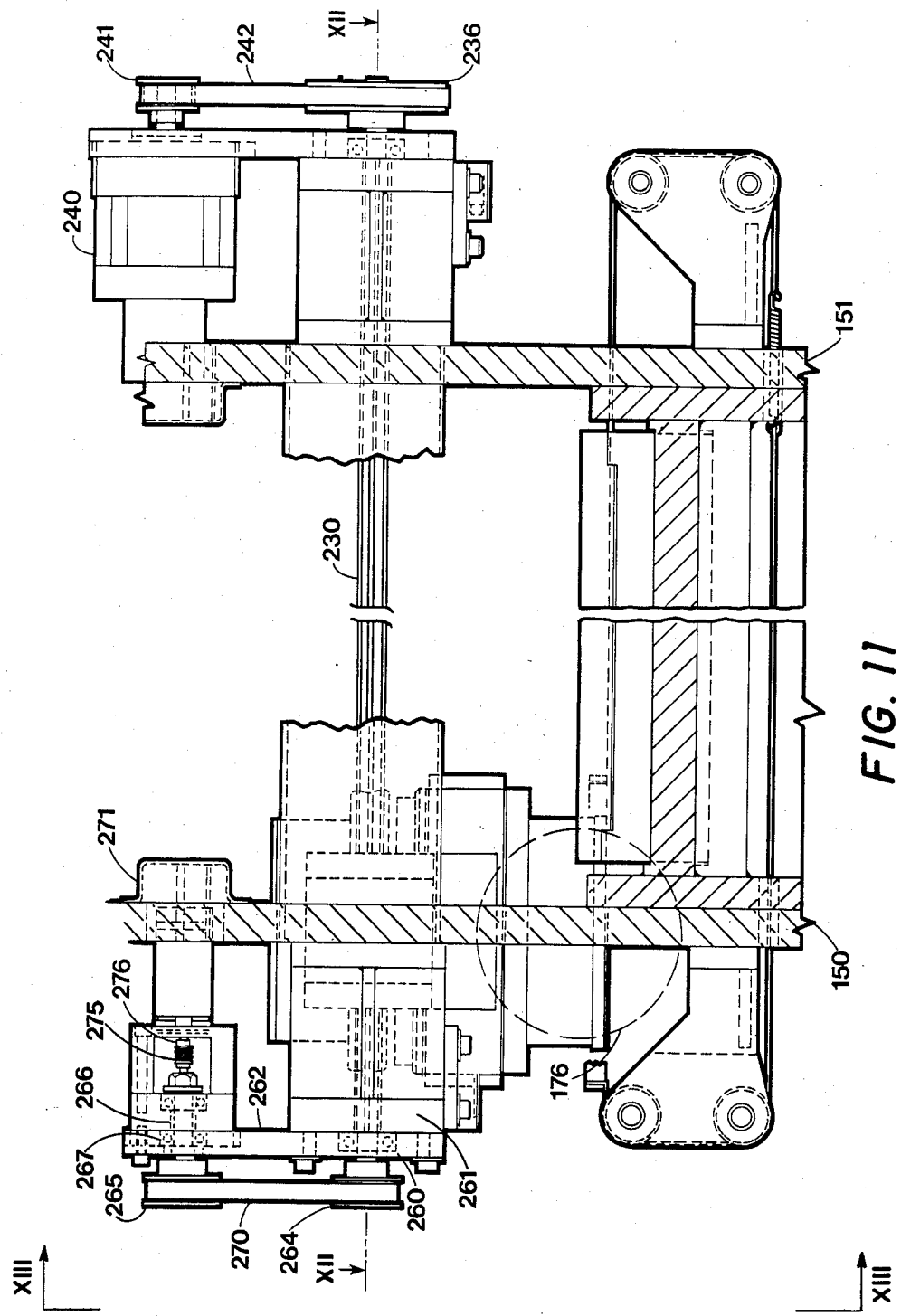
FIG. 11 is a front elevation of the cutter assembly.

Referring to FIG. 11, a D-axis servomotor 240 is mounted on the right plate structure 151 adjacent the D-axis drive shaft 230, the D-axis servomotor having a drive pulley 241 in lateral alignment with the D-axis pulley 236, a drive belt 242 being engaged with pulleys 236 and 241 for driving the D-axis shaft 230. A similar motor and pulley assembly is positioned directly behind the D-axis drive motor 20 and pulleys 241, 236 and thus not shown in FIG. 11, is mounted adjacent the W-axis shaft for driving the W-axis shaft.

Referring to FIG. 14, the threaded W-axis ball screw rod 222 is engaged with a ball nut assembly 248, having recirculating ball nuts, which in turn is rotatably mounted within an annular drive housing 249 which is rigidly affixed to the manifold block 202. Rotation of the threaded drive screw 222 within the ball screw nut assembly 248 causes translation of the housing 249, the attached mounting structures 250 (FIG. 12) and the air motor 190 along the W-axis; i.e., along the drive shaft 222, and along the D-axis shaft 230, as will now be described. A similar, drive housing 251 (FIG. 12) is mounted to the manifold block 202 on the side opposite the W-axis ball nut assembly 248, as shown in section in FIG. 12. Within the drive housing 251 is rotatably mounted a worm gear 252 which is keyed to a linear ball bearing bushing 253 within which are recirculating balls 254 which permit the D-axis drive housing 251 and mounting structure 250 to move axially along the D-axis shaft 230.

The recirculating balls 254 in the linear bushing assembly 253 thus permit linear movement of the housing and cutter assembly 143 along the D-axis shaft upon rotation of the ball screw W-axis drive rod 222 within the ball nut assembly 248. A normally open microswitch 255 is mounted on structure affixed to left cutter assembly mounting plate 184 and positioned in line with and facing the drive housing 249, whereby its switch element is closed upon contact with the housing 249 when the cutter assembly is in its extreme leftward position as shown in FIG. 12, [for providing a position signal to the CNC control unit 278, as will be described.]

Referring to FIG. 14, the D-axis shaft 230 has three key ways 258 which are engaged within grooves formed axially within the bushing 258, for permitting relative linear motion of the bushing 253 along the D-axis shaft 230 and for preventing relative rotational movement of the two members. As the cutter assembly 143 is translated laterally along the D-axis shaft 230 and the W-axis drive screw shaft 220, the cutter wheel is driven by air pressure supplied through tubing 193 to drive motor 190 and, because of its high rotational velocity of, for example, 25,000 revolutions per minute, the cutter wheel 176 is effective to cut the layup tape 19 along a desired trim line, as will be further discussed below.

The cutter wheel 176 is shown in the drawings (FIG. 6) in a position in which it is oriented perpendicularly of the W-axis and perpendicular of the longitudinal axis of the tape. By operation of the D-axis drive shaft 230 and associated D-axis drive mechanism, however, it is possible to rotationally translate the cutter wheel 176 and the drive motor about the D-axis 181 to any desired cutting angle for permitting cutting of the tape along a selected path. When a non-perpendicular cut is desired, the D-axis drive motor 240 (FIG. 11) is energized for rotating the D-axis shaft 230, which causes the worm drive 252 (FIG. 12) to be rotated in engagement with a driven, worm follower crown gear 259.

Referrrig to FIGS. 12 and 14, the worm follower gear 259 is rigidly affixed to the cylindrical member 217, and its rotation induces rotation of the entire cylinder and motor assembly, including drive motor 190 and cutting wheel 176. Accordingly, rotation of the D-axis shaft 230 causes rotational movement of the cutter wheel 176 about the D-axis 181 to a desired orientation. The positioning of the cutter wheel at a desired angle is controlled by a feedback resolver system, to be described.

Referring to FIG. 11, the D-axis shaft 230, at its end opposite the end upon which pulley 236 is mounted, projects beyond the left plate structure 150, through bearing 260 and bearing mounting structure 261 supporting a mounting plate 262, and has an end portion upon which a timing pulley 264 is mounted. A driven pulley 265 laterally aligned with pulley 264 is rotatable upon a shaft 266 which is rotatably seated within bearings 267 mounted within mounting plate 262. Drive belt 270 engages the two pulleys 264, 265 for effecting simultaneous movement of the shaft 230 with shaft 266. An electromechanical position resolver 271 is mounted on the left plate structure 150 in axial alignment with the driven shaft 266, and a flexible coupler 275 is connected between the driven shaft 266 and a drive shaft 276 of the position resolver 271. The position resolver 271 (as are the other resolvers) is again preferably of the type operable for generating a signal corresponding to the rotational position of the D-axis shaft 230.

Rotation of the D-axis shaft 230, driven by D-axis servomotor 240 thus causes rotation of pulley 264, and corresponding rotation of pulley 265, shaft 267, and shaft 276, which is sensed by electromechanical resolver 271. The resolver 271 transmits phase angle sine wave signals to a position comparator within the CNC control unit 278. When the cutting wheel 176 is rotated upon the D-axis 181 until it reaches a desired orientation, the comparator circuit is operable to cut off current to the D-axis drive motor 240, thereby positioning the cutter wheel. A similar, W-axis position sensing resolver (not shown) and drive belt (not shown) is positioned immediately to the rear of the resolver 271 as viewed in FIG. 11 and is similarly operable to sense and control the positioning of the housing 250 along the W-axis drive shaft 222. The lateral position of the housing 222 and cutter assembly is again controlled by the programmed CNC numerical control system, as will be described hereinbelow.

Figure 15:
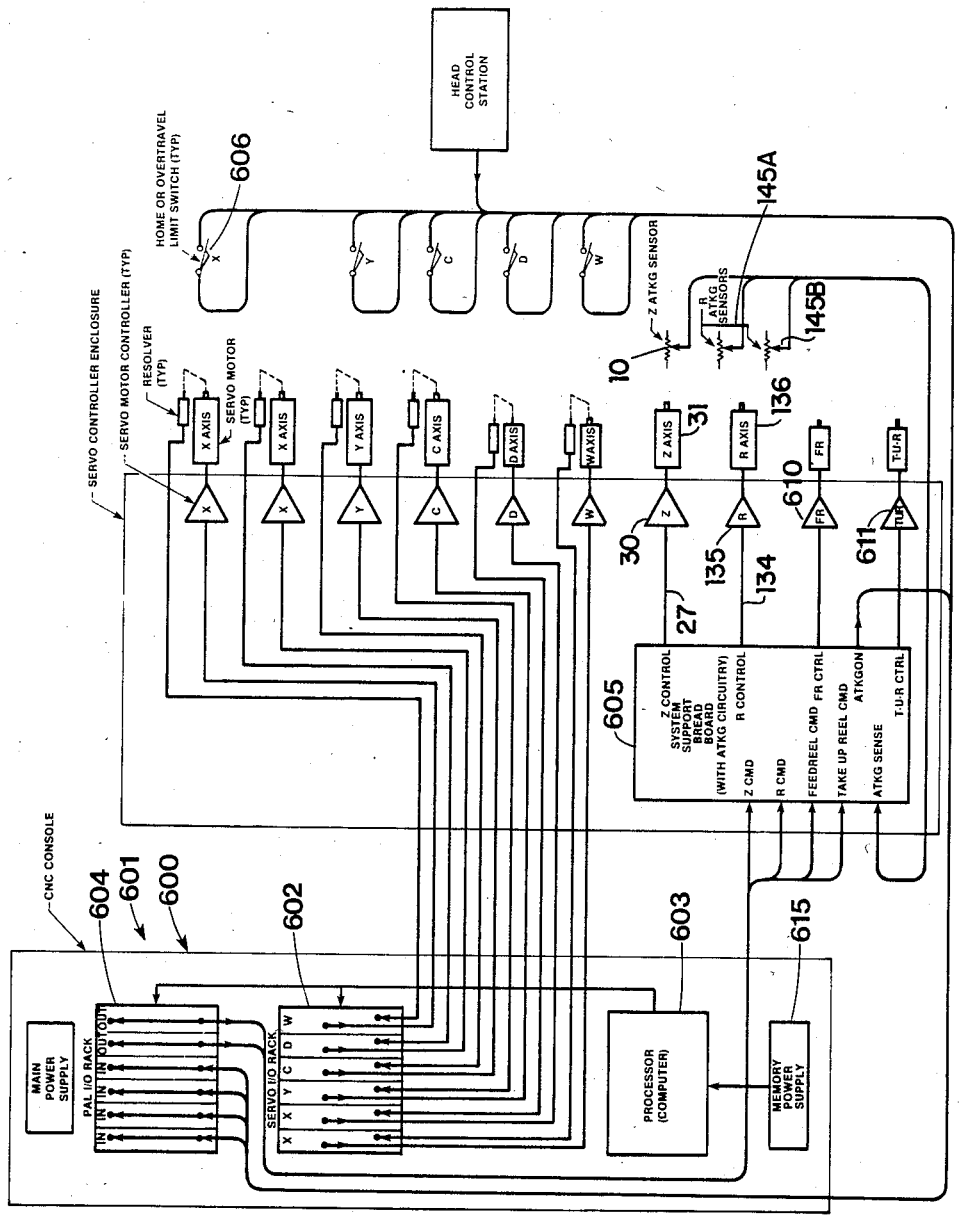
FIG. 15 is a block diagram of the automatic control system.

The control system as shown diagrammatically in FIG. 15 operates on an absolute or incremental coordinate programming system based upon an initial position signal received from the limit, home limit switches. As an example, the D-axis limit switch is activated by a cam positioned on the drive gear 259 and operable to close a circuit through the limit switch when the D-axis is in a "home" position, i.e., when the cutter wheel 176 is positioned in its perpendicular position as shown in FIGS. 12 and 14. Similarly, the home position sensing switch 255 (FIG. 12), mounted upon plate 184, is operable to sense the "home" or extreme leftward position of mounting structure 250, and the relative positions of the mounting structure 250 throughout its lateral range of movement is thereafter controlled by the absolute coordinate programming system of the computer of the control system during operation.

The control system, as will be described in more detail in a later section, may employ absolute coordinate position points; for example, if the position of the housing 146 (FIG. 6) is three inches to the right of the home position, and it is desired to cut a six inch tape, the control system emits a control signal causing rotating of the W-axis drive screw 222 sufficient revolutions to move the housing structure 250 to the right by an additional six inches, or until the right position is reached. The above mechanism is shown in end view in FIG. 13 wherein the D-axis resolver pulley 265 is shown having stub shaft 267 keyed to the pulley 265 and driven by the timing belt 270 which is engaged upon a corresponding pulley 264 mounted upon the D-axis drive shaft 230. Similarly, the W-axis drive screw shaft 222 is keyed to a corresponding pulley 272 upon which a timing belt 273 is engaged and which is connected to a corresponding pulley 274 non-rotatably mounted upon a stub shaft which drives a W-axis position resolver (not shown) similar to the position resolver 271 shown in FIG. 11.

Figure 16:
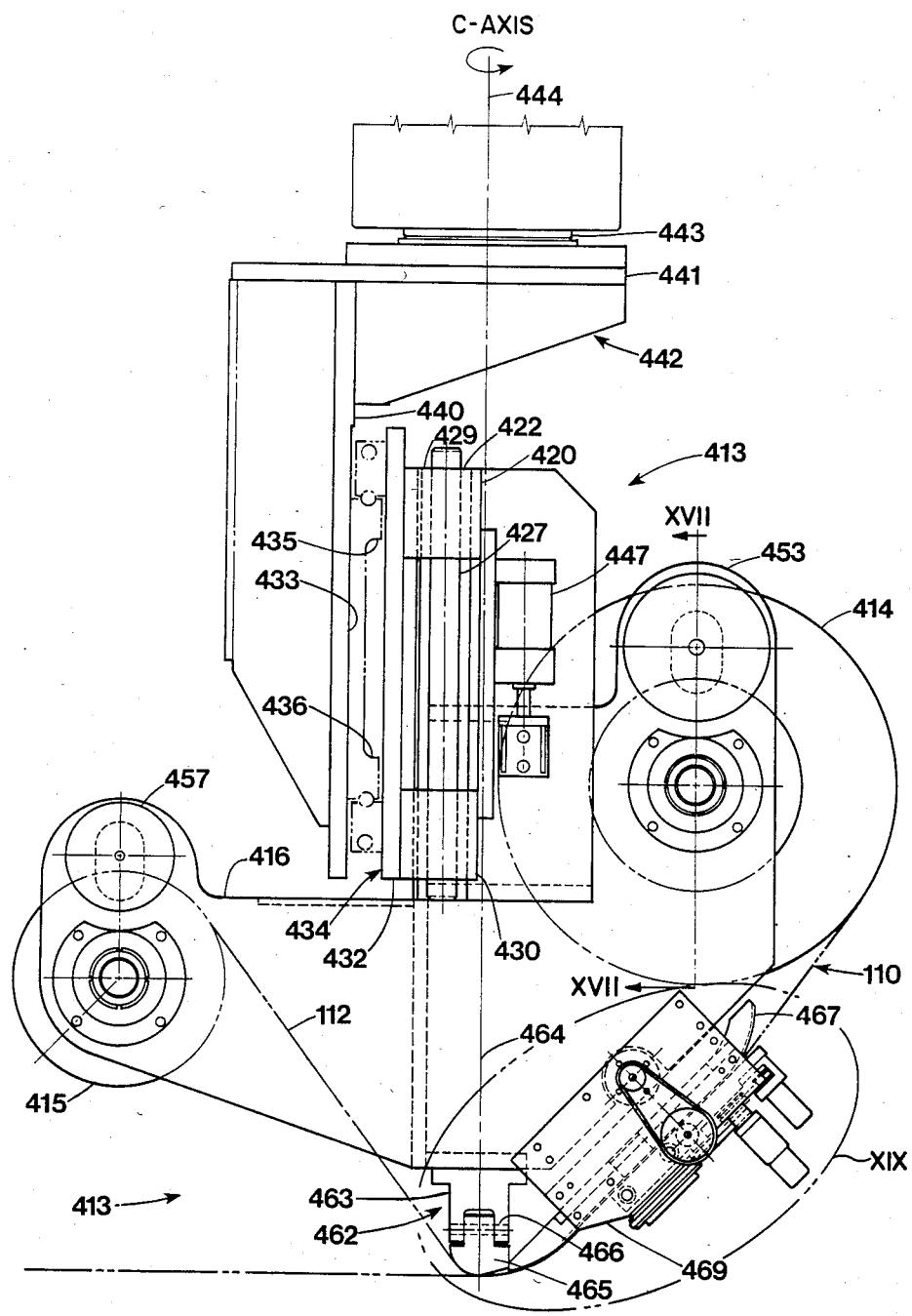
FIG. 16 is a side elevation of a second embodiment of the tape head assembly.

With reference to FIG. 16, a second embodiment of the tape head assembly 413 employs a tape transporting and cutting mechanism which differs from the embodiment described hereinabove and which affords advantages for applications in which shorter tape lengths are to be applied. The tape head assembly 413 is also somewhat lighter and more readily positioned over a mold of complex contour. In the second embodiment, the tape cutting mechanism is not mounted on an arcuate bearing assembly for translation about a horizontal rotational axis during cutting and laying of the tape, and the fibrous tape is not positioned in tension between the applicator shoe and the takeup reel during cutting operations. Instead, the fibrous tape is severed while still affixed to the backing tape, and it is applied to the mold structure surface subsequent to cutting within the transport mechanism. Whereas in certain existing tape laying machines, the fibrous tape must be separated from the backing tape by means of a splitter wedge or knife directioned toward the interface between the fibrous tape and the backing tape for permitting cutting of the fibrous tape without scoring and weakening the backing strip; the present cutting mechanism does not require that the fibrous tape be separated from the backing strip during cutting operations. The cutting mechanism therefore eliminates the difficulties entailed in such prior art procedures, such as the necessity of separating the adhesive tape from the backing strip and subsequently readhering the tape to the backing strip prior to laying of the tape, and the consequent difficulties entailed. In certain prior-art systems, for example, it has been required to heat the fibrous tape stripped from the backing strip in order to plasticize its resin to permit readherence of the tape to the backing strip. Deleterious effects of such processes may include distortion to the fibrous tape through the separation process, and premature curing or stiffening of the tape through the heating process wherein satisfactory readherence of the fibrous tape to the backing strip, and adherence of the tape to the mold, may not be obtained.

Figure 18:
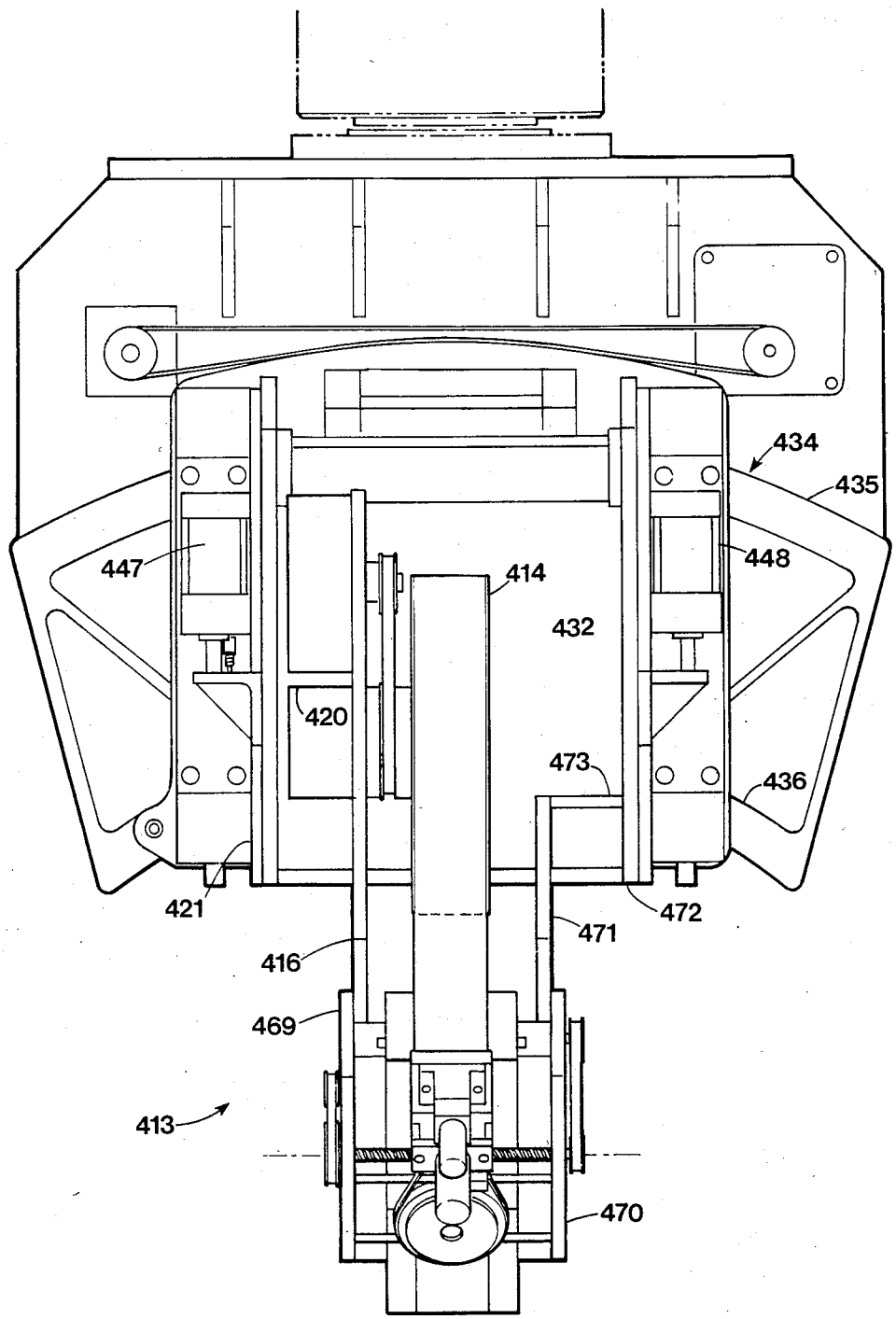
FIG. 18 is a front elevation of the tape head assembly of FIG. 16.

With reference to FIG. 16, the tape head assembly 413 includes a supply reel 414 and a takeup reel 415, each mounted on a rigid mounting plate structure 416. Referring additionally to FIG. 18, the plate structure 416 is affixed in parallel relationship, as by flanges 420, to a left, vertical support plate 421 which is affixed to vertical shaft 427 (FIG. 16) longitudinally slideable within upper and lower linear bushing assemblies 429, 430, which in turn are affixed, in vertical alignment, to a backing plate 432.

Vertically moveable shaft 427, bushing assemblies 429, 430, and backing plate 432 substantially correspond in structure and function to the vertical shafts 90, 91, bushing assemblies 85, 86, and backing plate 70 of the first embodiment as seen in FIG. 6. As in the first embodiment, R-axis movement of the tape head assembly 413 is permitted about an arcuate framework 434 (FIG. 18) defining upper and lower arcuate tracks 435, 436, which is affixed to a mounting or backplate 440 (FIG.

16). Backplate 440 depends from a horizontally extending top plate 441, the top plate 441, backplate 440, and associated structure comprising a tape head supporting framework 442. As in the prior embodiment, the entire framework 442 and tape head assembly 413 are fixed to a downwardly extending shaft 443 rotatable about a vertical, C-axis 444.

Figure 17:
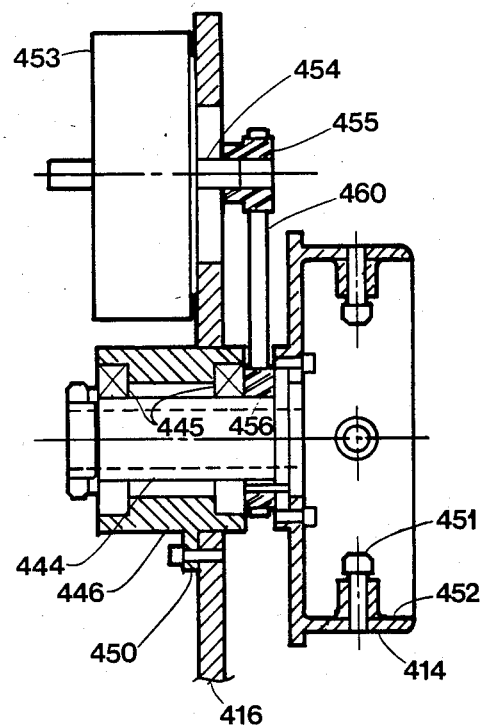
FIG. 17 is a cross-sectional view of the supply reel of the apparatus of FIG. 16.

Referring to FIG. 17, the supply reel 414 is mounted to the plate structure 416 upon an axle or shaft 444 rotatable within a bearing assembly 445 seated with a cylindrical bearing assembly housing 446, and extending perpendicularly of the plate structure. The bearing housing 446 includes flanges 450 for permitting the housing to be bolted or otherwise affixed to the plate structure 416. The takeup reel 414 is in the form of a hub, open in a direction facing outwardly from the plate structure 416, permitting convenient loading of a spool of tape over the cylindrical hub portion as indicated at 452. This configuration is appropriate for this embodiment of the apparatus because the guide chute and cutting mechanism maintain the tape in alignment with the supply reel and take-up reels. Lock screws 451 are provided extending radially outwardly through the hub for permitting securing of a spool of tape upon the reel 414. A servomotor 453 is mounted to the plate structure 416 above the takeup reel 414, the servomotor having a drive shaft 454 which projects through an opening formed through the plate structure 416. Mounted on the projecting portion of the shaft 454 is a timing pulley 455 positioned in lateral alignment with a corresponding pulley 456, which in turn is coaxially mounted upon the a shaft 444 between the takeup reel 414 and the bearing assembly housing 446, for rotation with the shaft 444. A drive belt 460 engages the pulleys 455 and 456 for applying a counterclockwise torque, as viewed in FIG. 16, to the takeup reel 414 in the manner described with reference to the first embodiment of the tape head assembly. The supply reel 414 mounted on the plate structure 416 is suitably positioned in approximate horizontal alignment with the mounting plate 432 along the normally forward or leading portion of the plate structure 416, and the takeup reel 415, and a corresponding takeup reel motor 457, is mounted along the upper, rear portion of the plate structure 416.

Referring to FIG. 16, an applicator shoe assembly 462 similar to the primary applicator shoe assembly of FIG. 6, is mounted to the plate structure 416 at its centeral, lower portion, the shoe assembly 462 having a downwardly projecting mounting block 463 mounted on the plate structure 416 by horizontally extending bolt 464, the mounting block having a longitudinal slot, extending perpendicularly of the plate structure and open downwardly, for receiving an applicator shoe insert 465 of a low friction material such as Teflon, thus corresponding in structure to the primary applicator shoe 131 of the first embodiment. A bolt 466 is similarly extended through the mounting block 463 and insert 465 and is engaged within a stepped bore formed in the block for permitting limited rocking movement of the shoe 465 about the axis of the bolt 466. Guide chute 467 is mounted between plate structures 416, 471 (FIG. 18) in alignment with the supply reel 414 and the applicator shoe 462.

Figure 19:
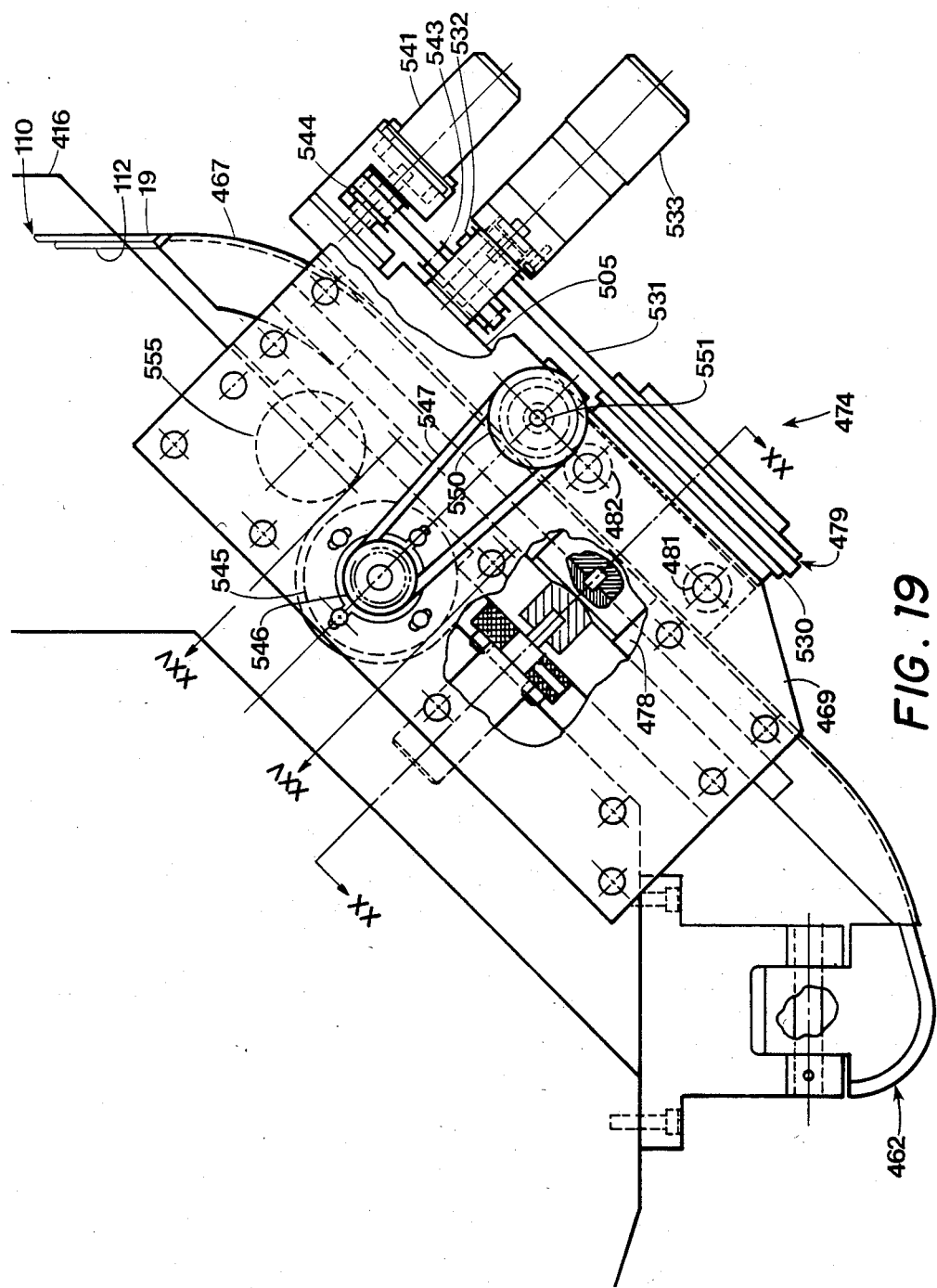
FIG. 19 is a fragmentary, side elevation, on an enlarged scale, of the cutter mechanism.
Figure 20:
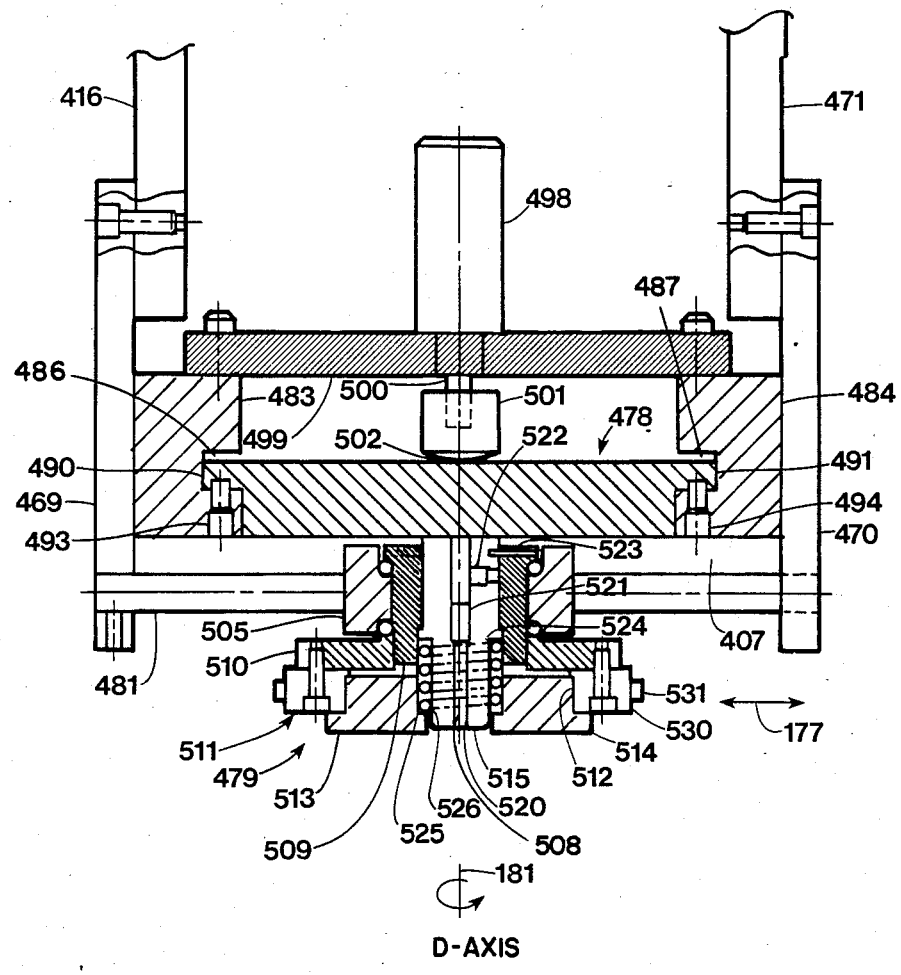
FIG. 20 is a cross-sectional view of the cutter mechanism and stylus assembly.

With reference to FIG. 18, a left cutter assembly mounting plate 469 is affixed to the outer surface of the plate structure 416 and, as seen in FIG. 16, the mounting plate 469 extends along the side of the plate structure 416 between the supply reel 414 and the applicator shoe 465. A corresponding, right mounting plate 470 (FIG. 18) is affixed to a plate structure 471 which extends in parallel to the first major plate structure 416. Plate structure 471 is affixed to a right vertical support plate 472 by means of flanges 473, the right vertical support plate being affixed to the backplate 432. With reference to FIG. 19, the left cutter assembly mounting plate 469 is bolted or otherwise suitably affixed to the plate structure 416 for supporting the cutter assembly 474. The tape structure 110 comprising the fibrous tape 19 and the backing tape 112 is conducted along the chute track through the cutter mechanism 474 to the applicator shoe assembly 462 between an anvil structure 478 and a stylus housing assembly 479. Referring to FIG. 20, the stylus housing assembly 479 is slideably mounted on the first guide rod 481, and as shown in FIG. 21, a second guide rod 482 parallel to the first, the guide rods 481, 482 extending along the W-axis 177 between and connected to the left and right cutter assembly mounting plates 469, 470.

The anvil assembly 478 (FIG. 20) comprises a rectangular plate structure having left and right projecting flanges 483, 484. Left and right, elongated guide blocks 483 and 484 are affixed to the left and right cutter assembly mounting plates 469, 470, respectively and extend parallel to and immediately above the guide chute 467 (FIG. 19) along the path of the tape structure 110. The mounting blocks 483, 484 have respective longitudinally extending grooves 486, 487 extending along their length, cut into the inwardly facing surfaces of the guide blocks 483, 484. The anvil 478 is provided with upper, outwardly projecting, left and right flanges 490, 491 which, in use, project within the grooves 486, 487 of the mounting blocks 483, 484 and which are of vertical cross-sectional width somewhat less than the width of the rectangular slots 486, 487, whereby the anvil 478 is free to move to a limited degree in the vertical direction within the slots 486, 487. Left and right coiled spring assemblies 493, 494 are seated within corresponding bores formed vertically through the mounting block structures 483, 484, respectively, and project upwardly into contact with the lowermost surface areas of the flanges 490, 491, the spring assemblies 493, 494 having plungers biased against the flanges and urging the anvil structure 478 upwardly within the grooves 486, 487. An electromagnetic actuator 498 is mounted upon a mounting plate 499 adjacent and above the anvil 478. Mounting plate 499 extends between and over the left and right mounting blocks 483, 484 and is bolted to their upper surfaces, respectively, for rigidly positioning the electromagnetic actuator assembly 498 in place. The electromagnetic actuator assembly 498 includes a plunger 500 which extends downwardly from the mounting plate 499 toward the anvil 478, the plunger 500 having a generally cylindrical cam member 501 having a semi-spherical cam surface 502 facing the upper surface of the anvil 478, for exerting downward pressure against the anvil 478 in response to electromagnetic pressure applied to the electromagnetic actuator 498 from a source, to be described. Accordingly, the anvil 478 is urged downwardly by the electromagnetic actuator 498 into contact with the upwardly facing side surfaces of grooves 486, 487 when current is applied to the electromagnetic actuator, and is urged upwardly by spring assemblies 493, 494 when current is reduced within the electromagnetic actuator 498.

Figure 21:
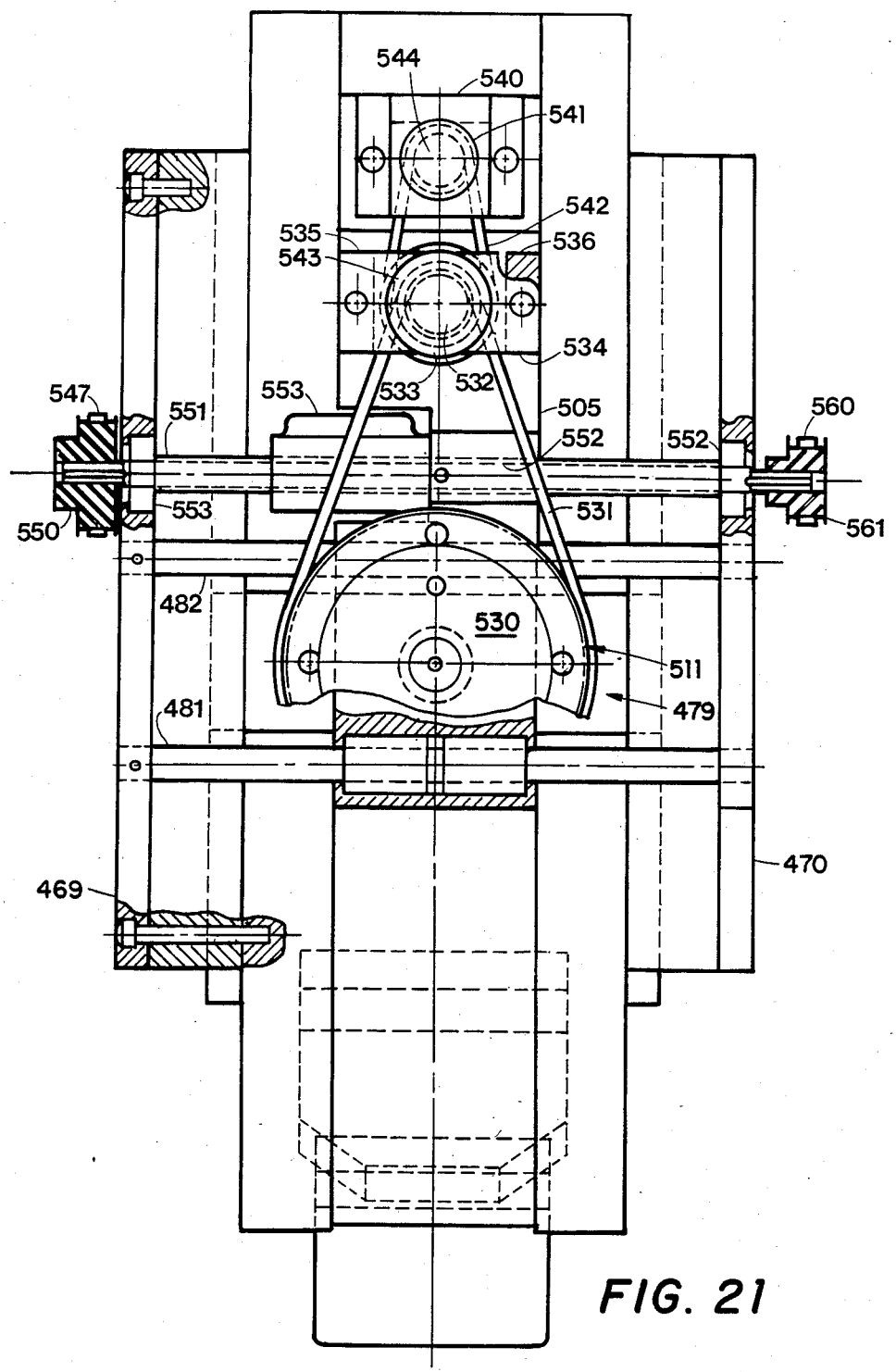
FIG. 21 is a plan view, partially broken away, showing the lower elevation of the cutter mechanism of FIG. 19.
Figure 22:
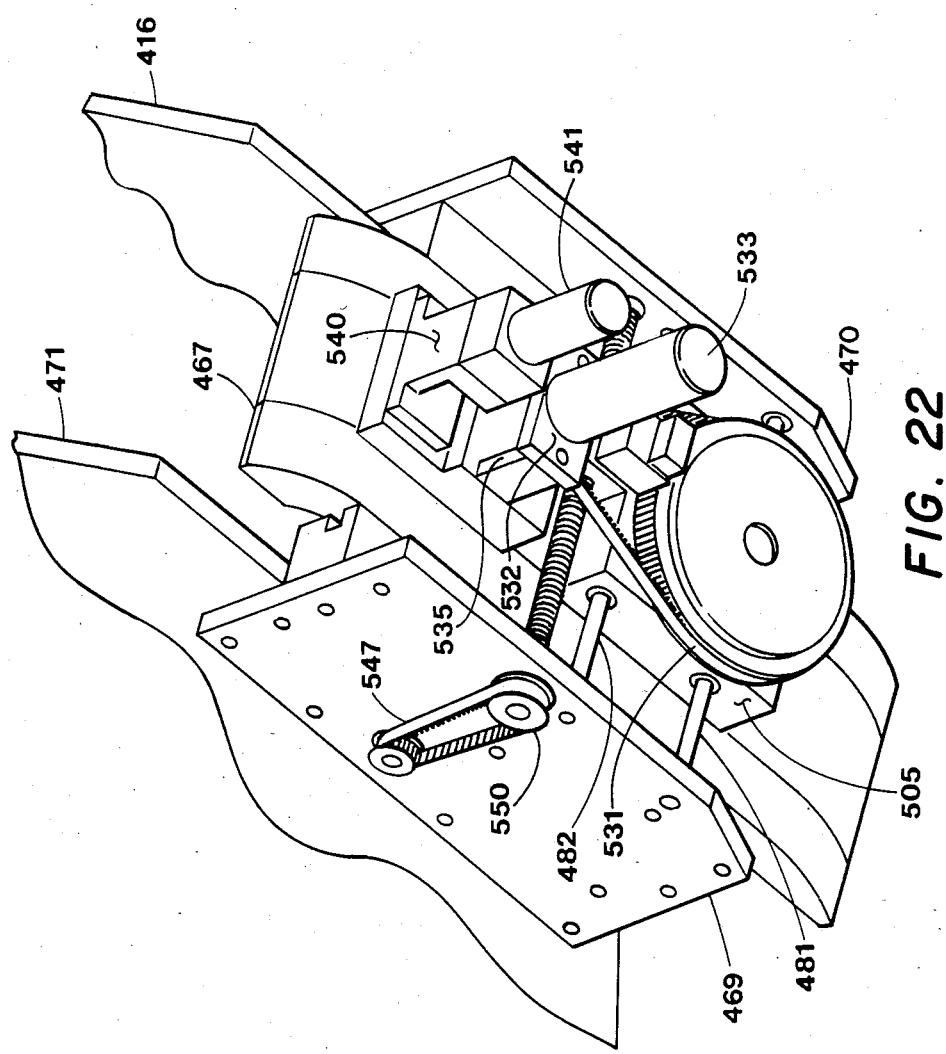
FIG. 22 is a perspective view of the cutter mechanism showing the tape guide.

Referring additionally to FIG. 21, the stylus housing assembly 479 includes a carriage block 505 having bores for slideably receiving the guide rods 481, 482, the mounting carriage 505 extending longitudinally between the left and right mounting plates 469, 470. Referring to FIG. 20, the mounting carriage 505 is adapted to rotatably receive the stylus assembly carriage 479 within a D-axis bearing assembly 507. Referring to FIG. 22, the stylus housing assembly carriage 505 is slideably mounted on first and second, mutually parallel guide rods 481, 482, connected between the left and right cutter assembly mounting plates 469, 470, and extending along the W-axis 177 (FIG. 20) for permitting slideable movement of the carriage 505 and stylus housing assembly 479 along the W-axis.

Figure 23:
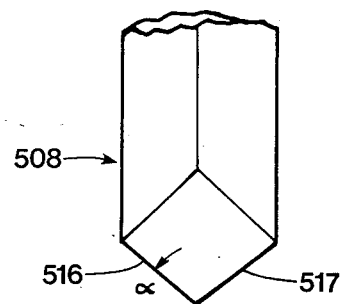
FIG. 23 is a fragmentary, side elevation of the cutter stylus.
Figure 24:
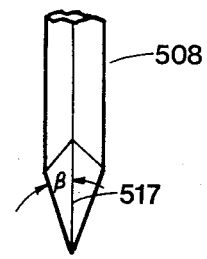
FIG. 24 is an end elevation of the cutter stylus.

The stylus housing assembly 479 includes several components which are mutually affixed for rotation within bearing assembly 507 and for positioning a stylus 508 in contact with the fibrous tape 19. With reference to FIG. 20, these include a generally cylindrical sleeve member 509 which is rotatably mounted within bearing assembly 507 for rotation about the D-axis 181. The sleeve member 509 extends downwardly beyond the carriage 505, and its projecting portion is coaxially affixed within an annular plate 510 which extends radially outwardly, below the carriage 505. A ring member 511, of rectangular local cross section, is bolted to the lower surface of the annular plate 510, coaxially of the plate, and its inner cylindrical surface is provided with threads 512. An annular cap or insert member 513 is threadingly engaged within the ring member 511, and its lowermost portion is extended radially as an outwardly projecting, annular flange 514, which projects beyond the ring member 511 and limits the rotation of the cap member within the ring member. As shown in FIG. 23, the stylus, 508, in side elevation, preferably comprises a cutting knife having first and second cutting edges 516, 517. In our experiments we have found that the angle of attack, i.e., the angle of attack defined by the leading cutting edge of the stylus and the plane of the tape is preferably approximately 40°, and it is preferably within plus or minus 5 percent of 40 degrees, i.e., from 35 to 45 degrees, and may fall within the range of 30 to 50 degrees. This angle $\alpha$ is selected to effect cutting of the longitudinal fibers within the tape. In the end view (FIG. 24), the knife tapers to the cutting edge and includes relief angles $\beta$ of approximately 15° from the center to the sides of the cutting knife. Configurations substantially different from the above, having cutting angles greater than =percent, have been found to distort and push aside the strands of tape rather than severing them. If the angle of the cutting edge of the knife is reduced, the knife tends to ride above the tape rather than completely severing the strands.

Referring to FIG. 20, the stylus 508 is carried within an elongated, cylindrical stylus carriage 515, the stylus carriage having a bore 520 formed coaxially therethrough for receiving the stylus, the bore having internal threads for receiving a positioning set screw 521 which is employed for longitudinally positioning the stylus 508 within the bore 520. A laterally extending set screw 522 is threadingly engaged within a bore formed radially through a sidewall of the stylus carriage 515 for rigidly positioning the stylus 508 at a desired position within the stylus carriage 515. In operation, the stylus is positioned such that its cutting edge projects beyond the stylus carriage for a sufficient distance to scribe and sever the fibrous tape 19 during W-axis movement of the carriage 505 and stylus housing assembly 479, but the stylus is not permitted to project sufficiently to damage or sever the backing strip 112. The position of the stylus within the carriage assembly is adjusted most accurately by empirical testing on the particular tape structure to be employed, in that the thicknesses, plasticity, material structure, and resins of composite tapes may vary from lot to lot, and thus may exhibit differing cutting characteristics in actual use. Typically, however, the appropriate projection of the stylus tip beyond the carriage has been found to correlate with of the thickness of the fibrous tape 19. The stylus carriage 515 is itself splined to the sleeve member 509, for preventing relative rotational movement between the two elements, by a pin 523 which is extended through a bore formed radially through sleeve 509, and within a corresponding longitudinally extending groove formed in the side of the stylus carriage 515. The lower portion of the stylus carriage 515 is of a reduced diameter, having a downwardly facing, radially extending seat 524 at its mid-portion. The upper portion of the insert member 513 is also of a reduced diameter, defining an upwardly facing seat 525. A coil spring 526 is mounted coaxially of the reduced diameter portion of the stylus carriage 515, and its ends are footed against the seats 524, 525 for urging the stylus carriage upwardly within the sleeve member 509.

In use, the cutting force exerted by the stylus is partially controlled by the degree of pressure exerted by the spring 526 against the stylus carriage 515, and the pressure may be adjusted by rotationally positioning the cap member 513 within the ring member threads 512. Limited vertical movement of the stylus carriage assembly is permitted because of the slideable engagement of the carriage within the housing sleeve member 509, and because the spline pin 523 is slideable, relative to the carriage, within the slot extending longitudinally of the stylus carriage 515.

The outer circumferential surface of the ring member 511 defines a sprocket 530 for receiving a D-axis timing or drive belt 531. Referring to FIG. 21, the D-axis drive belt 531 also engages a drive pulley 532 which is affixed to the shaft of a D-axis servomotor 533, shown more clearly in FIGS. 19 and 22. The D-axis servomotor 533 is affixed to a mounting plate 534 bolted to left and right mounting blocks 535, 536 which are affixed and extend downwardly from the carriage 505. A mounting plate 540 is similarly affixed to the carriage 505 for supporting a D-axis position resolver 541 driven proportionally to the rotation of the D-axis motor 533 and D-axis pulley sprocket 530 by means of a timing belt 542 engaged with pulleys 543, 544 affixed to the shafts of D-axis motor 533 and D-axis position resolver 541, respectively. The rotation of the D-axis servomotor 533 is thus effective to rotatably position the stylus carriage assembly 479 (FIG. 24) about the D-axis 181, and accordingly, to position the D-axis cutting angle of the stylus 508. The position of the stylus is sensed by the control computer (FIG. 15), by means of signals fed from the D-axis position resolver 541, as will be more fully described hereinbelow.

Figure 25:
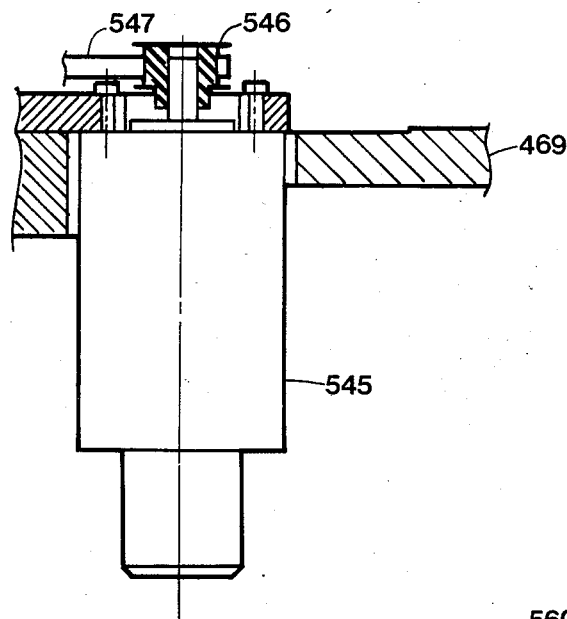
FIG. 25 is a cross-sectional, partially diagrammatic representation of the W-axis motor and associated components.
Figure 26:
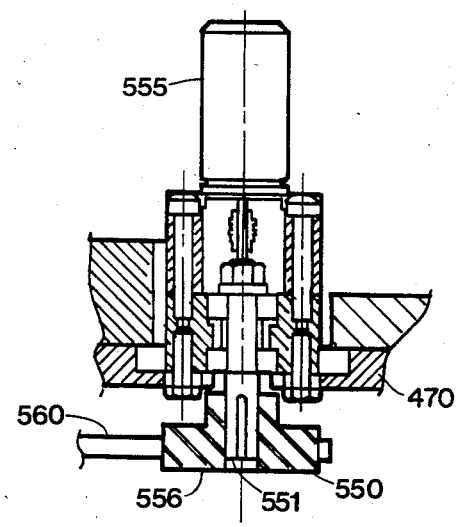
FIG. 26 is a cross-sectional representation of the W-axis resolver and associated components.

Translation of the stylus housing assembly along the W-axis is accomplished by a W-axis motor 545 mounted on the left cutter assembly mounting plate 469 above the carriage 505, the W-axis motor 545 having a motor pulley 546 (FIG. 25), engaging a timing belt 547 (FIG. 19) which extends from the W-axis motor alongside the mounting plate 469 to engage a corresponding W-axis drive pulley 550 (FIG. 26), which is non-rotatably mounted on a W-axis drive shaft 551. As seen most clearly in FIG. 21, first and second bearing structures 552, 553 are seated within cutter assembly mounting plates 469, 470 for rotatably receiving the W-axis drive shaft 551. The W-axis drive shaft 551 includes a threaded mid-portion which extends laterally through a bore 552 extending through a mid-portion of the cutter assembly carriage 505, the threaded shaft additionally extending through an internally threaded ball nut assembly 553 affixed to the side of carriage 505 within a cutout portion of the carriage 505. Rotation of the W-axis drive shaft 551 within the internally threaded nut assembly 553 effects lateral movement or movement in the W-axis, of the carriage 505 and the stylus assembly 479 and, as will be seen below, effects cutting of the fibrous tape 19. A W-axis position resolver 555, as seen more clearly in FIG. 26, includes a timing pulley 556 engaging a timing belt 560 which extends downwardly to engage a W-axis timing pulley 561 (FIG. 21) mounted on a portion of the W-axis drive shaft 551 extending beyond the right cutter assembly mounting plate 470.

Figure 27:
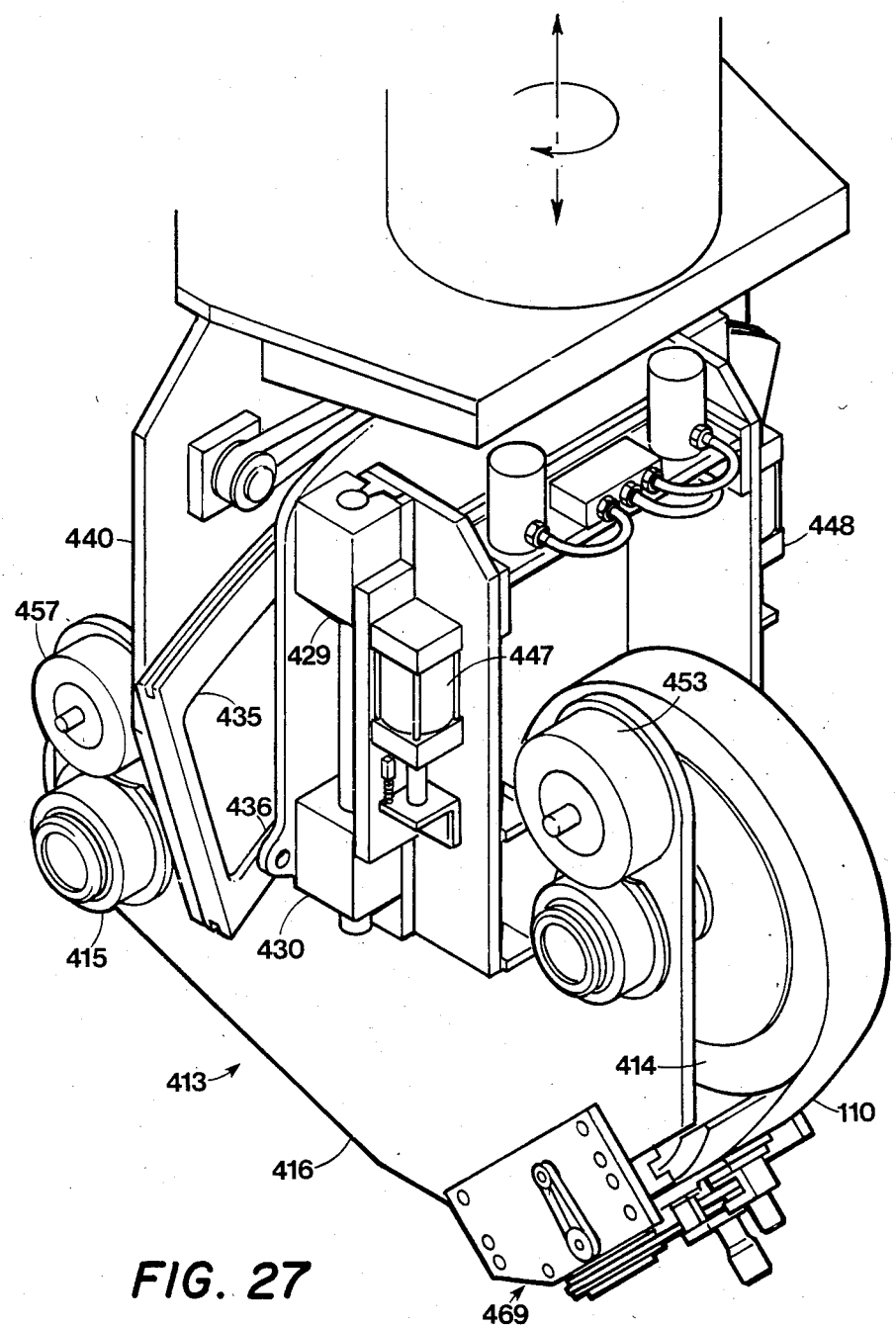
FIG. 27 is a perspective view of the second embodiment of the tape head assembly.

With reference to FIG. 27, movement of the tape laying head assembly 413 about the R-axis is accomplished by driving the head about upper and lower arcuate tracks 435, 436, as in the first embodiment. Counterbalancing pneumatic actuators 447, 448 are shown as employed for applying upward force for applying a desired degree of pressure to the tape structure 110 on the mold surface, as previously detailed.

As a first step in operating the machine, the stylus 508 (FIG. 20) is mounted within the stylus carriage 515, and the projection of the cutting edge from the stylus carriage is adjusted. Preferably the projection of the stylus tip beyond the carriage by a distance approximately equal to the thickness of the fibrous strip. In our experiments it has been found advantageous to subsequently adjust the stylus manually, to precisely position the blade for cutting the particular tape employed.

In bench testing, the carriage is drawn laterally across a strip of the tape to be used, and adjustments are made to correct scribing of the backing tape strip, which result from excess projection of the blade, or in unsatisfactorily cutting of the fibers which results from insufficient projection of the blade. The blade carriage 515 (FIG. 20) is then mounted within the cutter assembly carriage and the set screw 523 is tightened. The stylus carriage is then mounted within the carriage assembly 479, and the cap member 513 is tightened within the threads 512 to exert pressure against the stylus carriage. Testing then continues, with respect to the adjustment of the stylus cutting pressure, by cutting strips of tape in actual operation of the machine and subsequently adjusting the pressure on the stylus by means of marginal rotation of the cap member within the threads until cutting of the fibrous tape is consistently obtained without damage to the backing strip. The rotational position of the cap member 515 may conveniently be marked by indicator means on the cap member 515 and ring member 511.

In mounting the composite tape on the machine, a roll of the tape is placed on the supply reel 414, as shown in FIG. 29, and a leading strip is drawn from the roll of tape along the guide chute, between the stylus assembly 479 and the anvil 478, as shown in FIG. 19, and subsequently drawn under the applicator shoe 462, whereupon the backing strip is separated from the composite tape and drawn around the takeup reel and adhered by adhesive means to the takeup reel for recovering the backing strip. At this point, the torque motors 453 and 457 (FIG. 29), driving the supply reel 414 and the takeup reel 415, are actuated to effect counteracting or counterbalancing torques on the takeup reel and the supply reel 415, 414 for applying tension to the tape structure 110, and the section of backing strip 112 extending behind the applicator shoe. Preferably, the counterbalancing forces are substantially equal, whereby the tape remains stationary absent any external force tending to displace it. Sufficient torque is applied to tension and maintain the tape structure 110 and the backing strip 112 taut between the takeup reel, the shoe, and the supply reel.

The position of the elements movable about the various axes, i.e., the X-axis, the Y-axis, the C-axis, the D-axis, and the W-axis, is next calibrated with respect to the controls on the Allen Bradley machine. This is accomplished by moving the tape head assembly and cutter assembly components to known positions, i.e., known, home positions, and calibrating the control system of the Allen Bradley machine by the adjustment of controls when the controlled mechanisms are in their home position. As an example of the procedure for calibrating the position resolvers relative to the control system, a W-axis limit switch is positioned to one side of the carriage 505 (FIG. 21), the W-axis limit switch being a normally open microswitch which, upon the carriage member 505 contacting the limit switch, transmits a signal indicating that the W-axis home position is immediately outside the edge of the tape. The microswitch is positioned to provide a course indication to the control system of that position. Subsequently, a fine adjustment of the W-axis resolver 555 (FIG. 26) may be accomplished by manually rotating the resolver after loosening set screws within its mounting pulley to precisely zero the W-axis control at the edge of the tape. This position indication is entered into the computer as will be described in more detail in the description below of the control system, for effecting a command instruction at an appropriate time to activate the pneumatic actuator 498 (FIG. 20) to urge the anvil 478 downwardly against the cutting stylus 508 when it is desired to initiate cutting of the tape 19. Pressure exerted against the anvil 478 by the cam member 501 urges the anvil 478 downwardly against the pressure of springs 493, 494 and into contact with the upwardly facing walls of the slots 486, 487, through which the spring assemblies 493, 494 are extended, whereby the anvil 478 is brought into a known position relative to the carriage 505 and the stylus assembly 479. Activation of the W-axis drive motor is then effected, by rotation of the W-axis drive motor 545 (FIG. 25) causing rotation of the pulley member 550 and the W-axis threaded shaft 551 within the threaded circulating ball bearing assembly 553, driving the stylus assembly laterally across the tape. The velocity of the W-axis movement has been found to be uncritical with respect to cutting efficiency, and speeds up to a thousand inches per second across the tape have been implemented with no deleterious effects.

Application of the fibrous tape 19 to the mold surface is accomplished by actuation of the X and Y-axis servomotors, and position feedback systems to cause the tape head assembly to translate across the mold surface along a desired X-Y path, while positioning the tape head assembly vertically, by the Z-axis servomotor and servocontrol feedback system, such that the fibrous tape extending beneath the applicator shoe is urged against the mold surface with a desired pressure. The weight of the tape head assembly is not totally exerted against the tape, but is reduced by the counterbalancing force exerted by the pneumatic counterbalancing actuators 447, 448 (FIG. 18). Movement of the head assembly in the X-Y plane while the tape is urged against the stationary mold surface induces a linear force to the tape structure 110 tending to overcome the reverse torque exerted by the supply reel torque motor and withdraw the tape structure from the supply reel; and the take-up reel is then driven by the take-up reel servomotor to take in the backing strip. Under the control of the control system, the tape head assembly 413 is caused to traverse the mold along X-Y vector axes which are mutually parallel and mutually spaced, by a distance equal to the width of the particular tape employed. At the end of each pass over the mold, the tape is cut along a vector line appropriate for terminating the tape strip on the mold, contiguous with the edge of the workpiece which is being formed. This is accomplished by the control system, as will be described below. [Subsequent to each pass over the mold surface, the tape head is rotated about the C-axis by 180 degrees, and the tape head assembly is brought back across the mold along a parallel path spaced alongside the last strip of tape adhered to the mold.]

When it is desired to cut the tape perpendicularly, movement of the gantry in the X-Y plane is stopped when a position of the tape head 13 is reached which is spaced by a predetermined distance from the edge of the composite structure to be laid. With the Y-axis gantry motor and the X-axis gantry motor deactivated, the head is stationary, and the W-axis motor is energized to cut the tape perpendicularly, or normal to its longitudinal axis.

Tape laying operation is controlled by a computer numeral control system utilizing numerical control system 600. The control system 600, with reference to FIG. 15, preferably has a programmable controller interface 601, as an integral part of the computer, which receives signals from several of the position limit switches and transducers, as will be described. The programmable controller interface takes the place of an equivalent, electromechanical relay or timer counter system utilizing logic sensing and generation functions. The use of the programmable controller interface 601 and its associated software program is preferred for its programming flexibility and its elimination of maintenance and reliability problems associated with electromechanical relay logic systems.

An example of such an internally programmed machine is that manufactured by Allen Bradley Corporation as Model No. 7320, having a major axis, input/output control module 602 with sufficient output channels for position command control of the major axes positioning servomotors (i.e., the X, Y, C, D and W-axisservomotors) and sufficient input channels for their corresponding position transducer feedback units, i.e., the X, Y, C, D, and W-axis position resolvers. These positioning motors are controlled by the control system 600, as to their position and velocity, according to the position execution sequence program (commonly termed in the art the "part program") which is supplied suitably on 8-hole punch tape entered into the computer processor unit 603 from a tape reader, for the individual workpiece configuration required. Alternatively, position control commands can be entered by means of the integral keyboard on the Allen Bradley numerical control system.

Auxiliary input/output control modules 604 are provided for monitoring additional, digital auxiliary position sensing devices and for controlling Z and R axis servomotors during initial positioning, and the power input to the take-up and feed reel servomotors, for example. Such position control functions are not continuously controlled by the internal computer processes 603, but instead are controlled by adaptive feedback systems in external adaptive control circuitry 605 when in the adaptive control mode for automatic control of z and R axis movement, as will be described. Other inputs include, for example, signals received from position or limit switches sensing "over travel" and/or home position of components in the W-axis, Z-axis, C-axis, R-axis, X-axis, and Y-axis.

Continuous, major axis control is performed according to a resident program in the processor section 603 in the computer memory, in cooperation with the position execution sequence command program entered into the computer memory by means of the integral machine keyboard, or the tape reader, according to programming techniques commonly used in the art. Positioning in the Z-axis and R-axis is also controlled through the auxiliary input/output control modules 604 to effect initial or course positioning by the Z-axis and R-axis servo motors.

With continued reference to FIG. 15, the computer control interface circuits, and position input and output devices are shown in connection with input devices such as position resolvers for X, Y, C, D, and W axes which position resolvers are in mechanical association with the servomotors for these axes. Position indicating switches, which are suitably normally open limit switches, are suitably normally open position indicating switches as shown by exemplary limit switch 606.

Z and R-axis movement is controlled alternatively by the adaptive control system 605, during movement of the tape head assembly along the mold surface, and by initial, gross movement control during approach to the mold. Adaptive control sensors are mounted within the applicator head for sensing movement of the applicator shoe about the R-axis relative to the head, and Z-axis adaptive control sensors provide input signals relative to movement in the Z-axis of the shoe and supporting framework relative to tape head framework. The auto tracking inputs are analog signals which are received within the adaptive control circuit 605, which is an analog/digital control circuit for receiving input signals indicative of position information, i.e., Z and R-axis position, for adaptive normalization of Z and R-axis position relative to the plane of the mold surface, when Z and R-axis control is in the adaptive operational mode. Alternatively, the circuit 605 receives initial or course Z and R position commands through control console 604. Feed reel and take-up reel enable/disable commands are originated in console 604, as a result of command signals from the computer processor 603 as defined by the resident, auxiliary function control program. Analog output signals of a suitable voltage level and polarity are conducted from the adaptive control circuit 605 to the respective servomotor controllers, comprising, for example, DC amplifiers 610, 611, for the feed reel and take-up reel motors. Similarly, analog output signals of appropriate polarity and magnitude are provided to Z and R axis motor controllers for the Z and R-axis servomotors. The input/output module 602 has its outputs connected to provide analog signals of appropriate magnitude and polarity to DC amplifying motor controllers for powering the servomotors for X, X', Y, C, D, and W axes, for controlling the corresponding servomotors.

As was discussed summarily in the earlier section relating to initial activation of the apparatus, during the initial execution of a normal control command sequence, the tape laying head and associated components are positioned in the X, Y, C, D, and W home positions to provide an initial reference calibration within the computer memory 615, from which all subsequent commands will be referenced. At this time, a preselected position execution sequence command or part program is executed. The following is an exemplary part program, suitably utilized to form a workpiece of rectangular configuration with tape strips laid along a 45° path from the X-axis. The program is derived for the second embodiment of the tape head, but is applicable, with minor variations as will be discussed, for the first embodiment.

This example is of a typical part program, and the steps required to lay one strip of composite tape at a 45 degree vector angle from X axis, and to shear the end of the strip at a 45 degree angle.

The first sequence command instructs the machine to position the tape head assembly over the mold to lay the initial strip of composite tape.

N1 F0 X146.54 Y85.336 W0 C315 D135

N1: Program execution sequence number

F0: All axes velocity to execute at rapid traverse (1200"/min for XY and W, 3600 degrees/min for C axis and D axis positioning X146.54: X Axis to 146.540 inches from home
 Y85.336: Y Axis to 85.336 inches from home
 W0: W Axis to 0.000 (home position)
 C315: C Axis to +315.000 degrees from home
 D135: D Axis to +135.00 degrees from home N2 M04—lower the Z axis to the mold surface and inhibit further sequence execution until Z axis is in contact with the plane and has assumed adaptive control status with R axis N3 F600 X149.798 Y88.489—position X and Y axis along a 45 degree vector for a linear distance of 4.606" at a velocity of 600 inches/min. (The 4.606 inches is the "lead in" distance, at the end of which the command sequence for shearing the tape will be performed.)

N4 F450 W3.2 X152..06 Y90.751 M07—Extend anvil and shear tape at a 45-degree angle for 3.2" at a velocity of 450"/min.

N5 M06—Retract anvil

N6 F600 X158 Y96.796 M03—complete rollout dimension and execute M03 (raise Z-axis approx. 3" via timer in CNC)

N7 F0 X158 Y101.081 C135 W0 D45—index Y, C, D and W axis positions at rapid traverse and prepare to lay the next adjacent strip of tape N8 (etc.—continue laying subsequent strips of tape as shown above)

Step N2 accomplishes actuation of the adaptive control system for Z and R axes.

Step N3 is the lead command instructing the machine head to travel in the X-Y axis for the distance required to lay the initial length of tape to a position at which the tape cutting sequence must be instituted. A lead length of, for example, 10.1 inches, is required for accommodating the distance between applicator shoe and the cutter assembly.

Step N4 is the actual cutting sequence command, in which X-Y axis velocity is reduced, but not terminated, as the tape is cut by movement of the stylus along the W-axis.

It can now be seen that the apparatus provides a new and improved means for tape application which alleviates many of the difficulties experienced in previous tape laying machines. For example, the cutting head, in both embodiments, permits efficient cutting of the fibrous tape without the necessity of separating the fibrous tape from the backing tape prior to application to the mold surface, and subsequent readhering of the fibrous tape to the backing strip. The resin within the tape remains in the desired state of plasticity and tackiness, since it is not exposed to heat prior to its adherence to the mold surface. In the first embodiment, projection and rotation of the cutting wheel is effected by a single pneumatic cutting assembly. In the second embodiment, cutting is accomplished by an efficient cutting mechanism while the fibrous tape remains adhered to the backing strip, and cutting along axes skewed from the longitudinal axis of the tape is accomplished without stopping X/Y axis movement of the tape head.

Because of the use of dual X-axis tracks adapted to be mounted directly on a floor surface, and a conveniently transportable mold structure, the apparatus does not require the massive, integral, base structures employed in certain prior systems for supporting the work surface and gantry. Because of this mounting system, the mold structure 12 may be conveniently positioned under the gantry between the X-axis ways, and may be mounted on permanently mounted, or detachable wheels, not shown, connectable to the lower portions of the supporting legs of the mold surface table, for permitting convenient transporting of the mold table and workpiece from the tape laying machine to an autoclave area, not shown, for curing of the workpiece while the workpiece remains on the mold structure. This capability eliminates the requirement for transferring the workpiece from workstation to workstation during layup and processing, and makes more convenient the positioning of the work table under the gantry. The mold and supporting legs thus further comprise means for supporting the workpiece within an autoclave oven for curing.

The numerical control system, in combination with the particular electromechanical and pneumatic systems employed in the apparatus for actuation, position sensing, and calibration, provides the several advantages discussed above, and employs a commercially available numerical control computer system. Convenient programming is utilized in standard ASCII code format for various part configurations, while the complex position modifications required for X and Z-axis adjustment, to follow three dimensional mold contours, are accommodated by the pre-wired, adaptive control unit without additional programming. Additionally, the major axis, X, Y, and W control cutting on ply provides efficient cutting of the tape along varying axis without the necessity of stopping X-Y movement of the tape laying head. Because of its control, position feedback, and cutting systems, the apparatus is operable to predetermine appropriate tape strip length, cutting angle, and point of initial application on the mold for lay-up of a workpiece of a desired configuration, without subsequent trimming, or with only a minor degree of post lay-up trimming. In addition to providing the above operational advantages, the apparatus is of practicable manufacture and construction, employing commercially available components.

While only one embodiment of the apparatus, together with modifications thereof, has been described in detail herein and shown in the accompanying drawing, it will be evident that various further modifications are possible in the arrangement and construction of its components without departing from the scope of the invention.

What is claimed is:

1. An apparatus for applying a composite tape to a mold, comprising:
    a tape dispenser head for dispensing the composite tape;
    a mold having a surface adapted for receiving the tape;
    gantry means for translating the dispenser head over the mold in a desired pattern;
    control means for defining a preselected pattern of tape lengths on the mold surface by activating the dispenser head to cut the tape into lengths corresponding to respective lateral dimensions of a selected pattern;
    the tape dispenser head having a supply reel comprising means adapted to receive a composite tape structure having a fibrous tape layer impregnated with an uncured resin, and a backing strip adjacent the fibrous strip; further comprising means having a stylus blade with a cutting edge oriented substantially perpendicularly to the longitudinal axis of the dispensed fibrous tape layer and means for moving the blade across and through the fibrous tape layer and adjacent the backing strip, the means translating the blade comprising means preventing severing of the backing strip.

2. The apparatus of claim 1, the cutting means comprising means for cutting fibrous composite tape extending between the supply reel and the applicator means.

3. The apparatus of claim 2, including means mounting the cutting blade means and exposing a selectable cutting blade height projecting toward the tape structure by a distance substantially equal to the thickness of the fibrous tape.

4. The apparatus of claim 1 further comprising:
    control means for moving said blade across the composite tape while said gantry means is translating the dispenser head over the mold and the tape is being dispensed from the tape dispenser head.

5. Apparatus for applying a composite tape, adhered to a backing strip, to a mold surface, comprising:
    an applicator means for urging the composite tape against the mold and for adhering the composite tape to the mold surface;
    means for separating the backing strip from the fibrous strip adhered to the mold surface, said means including take-up reel means for collecting the backing strip and for imparting tension to the backing strip for stripping it from the composite tape;
    cutting means for cutting the fibrous tape, the means for separating the fibrous tape from the backing tape further comprising tensioning means for collecting the backing strip which is separated from the fibrous tape while sustaining tension on the backing strip extending between the supply reel and the take-up reel;
further comprising means for translating the applicator means and the tensioning means between a first relative orientation, in which the applicator means is positioned adjacent the mold surface and comprises means urging the tape structure against the mold surface and in which the tensioning means is spaced from the mold surface and comprises means guiding the backup tape along a path spaced from the mold surface and spaced from the fibrous tape applied to the mold surface, and a second relative orientation in which the applicator means is spaced from the mold surface and the tensioning means is positioned adjacent the mold surface and comprises means urging a portion of the backing strip which has been separated from the fibrous tape into contact with the fibrous tape which has been adhered to the mold surface, the applicator means and the tensioning means comprising, when in their second relative orientation, means guiding the fibrous tape from the applicator means toward the tensioning means and into contact with the mold surface and thereby defining a tensioned length of the fibrous tape extending between the applicator means and the tensioning means.

6. The apparatus of claim 5, cutter means comprising means for cutting the tensioned length of fibrous tape extending between the applicator means and the tensioning means when the applicator means and tensioning means are in their second relative orientation.

7. The apparatus of claim 5, the cutting means comprising means for cutting composite tape which is adjacent a backing strip.

8. An apparatus for manufacturing three dimensionally contoured composite structures comprised of layers of adherently bonded flexible tape formed in a desired pattern on a removeable contoured receiving surface, said apparatus comprising:
    (a) a support structure;
    (b) first means moveably mounted on said support structure including tape dispenser means for controllably dispensing said tape and cutter means for controllably cutting said tape;
    (c) a bed member for supporting a mold having a contoured receiving surface;
    (d) second means for selectively at least horizontally moving said first means with respect to said contoured receiving surface along selected paths, said first means being controllable to dispense said tape over said receiving surface as said first means is selectively moved with respect thereto;
    (e) control means including:
        (i) user programable third means coupled to said second means and responsive to digital coordinate data for controlling said second means to selectively move said first means over the receiving surface to dispense said tape on said receiving surface and for controlling said cutter means to selectively cut said tape into lengths corresponding to the outer dimensions of said receiving surface as defined by said digital coordinate data while said first means is being moved across said receiving surface; and,
        (ii) automatic fourth means operating independently of said third means including sensor means for detecting the contour of said surface and means coupled to said second means for vertically positioning said first means with respect to said contoured receiving surface.

9. The apparatus according to claim 8 where said programmable third means includes means for grossly controlling the vertical position of said first means and said automatic fourth means includes means for finely controlling the vertical position of said first means.

10. The apparatus according to claim 8 wherein said first means is radially moveable about an axis and wherein said automatic fourth means includes means for controlling the position of said first means about said axis to follow the contour of said receiving surface.

11. The apparatus according to claim 8 where said programmable third means includes means for grossly controlling the angular position of said first means and said automatic fourth means includes means for finely controlling the angular position of said first means.

12. An apparatus for manufacturing a composite structure, the apparatus being of the type operable for applying composite tape in a desired pattern on a receiving surface, comprising:
   (a) structure defining a mold surface;
   (b) first means for containing and dispensing the composite tape;
   (c) second means, for translating the first means across the mold surface along selected paths;
   (d) third means, having programmable control means, for defining a preselected pattern of tape lengths to be cut for application on the mold surface by cutting the tape into lengths corresponding to respective spatial dimensions of a desired configuration; and
   (e) fourth means including tape cutting means having blade means and control means for transversely moving said blade means across the tape while the first means is being translated in a continuous motion across the mold surface and the tape is continuously being dispensed by the first means over the mold surface.

13. The apparatus of claim 12 wherein the third means includes operator controllable data input means for altering the preselected pattern defined by the programmable means.

14. The apparatus of claim 13 wherein the fourth means comprises a scribe member, mounting means for holding the scribe in a preselected position, movable means for moving the mounting means, with the scribe member held thereby, traversely across the tape, and means for actuating the movable means when the first means reaches a preselected position relative to the mold surface.

15. The apparatus of claim 14, wherein the mounting means includes a face surface adapted to slidably contact the tape, and comprises a means utilizing the surface of the tape as a reference plane from which cutting depth is derived.

16. The apparatus of claim 12 wherein the fourth means is coupled to the third means and is controlled thereby.

17. An apparatus for manufacturing a composite structure of the type adapted for applying composite tape in a desired pattern to a receiving surface, comprising:
   structure defining a mold surface;
   first means for containing and dispensing the tape;
   second means, for translating the first means across the mold surface along selected paths;
   third means, having operator programmable means, for defining a preselected pattern of tape lengths on the mold surface by cutting the tape into lengths corresponding to respective spacial dimensions of a desired configuration while said first means is being translated across said mold surface;
   fourth means, responsive to elevationed variances in the mold surface, for causing the first means to track the contour of the mold surface during translation of the first means across the mold surface.

18. The apparatus of claim 17, the control means further comprising fourth means having sensing means for producing signals variable in correspondence with the position of the dispenser head relative to the mold, for enabling the first means to follow the contour of the mold surface as the first means is translated across the mold surface.

19. The apparatus of claim 18, the control means including a numerically controlled digital computer and program means for directing the formation of the desired configuration, further comprising means for actuating the fourth means independently of the program means upon the first means being translated across the mold surface.

20. The apparatus of claim 17, the second means having Z-axis positioning means for translating the first means toward and away from the mold, and R-axis positioning means for arcuately translating the first means about an axis substantially parallel to the direction of translation of the first means along the mold surface.

21. The apparatus of claim 19, the fourth means comprising sensing means adapted to contact the mold surface and provide a variable output related to the position of the first means relative to the mold surface, the second means comprising servocontrol means for effecting position corrective translation of the first means at a velocity which corresponds with the intensity of an output signal derived from the sensing means.

22. An apparatus for applying a composite tape to a mold, comprising:
   a tape dispenser head for dispensing the composite tape;
   a mold having a surface adapted for receiving the tape;
   gantry means for translating the dispenser head over the mold in a desired pattern;
   control means for defining a preselected pattern of tape lengths on the mold surface by activating the dispenser head to cut the tape into lengths corresponding to respective lateral dimensions of a selected pattern;
   the tape dispenser head having a supply reel comprising means adapted to receive a composite tape structure having a fibrous tape layer impregnated with an uncured resin and adapted to be cured to form a structural unit, and a backing strip adjacent the fibrous strip; further comprising means having a blade with the cutting edge oriented selectively at an angle ranging from a first to a second position wherein the first position is with the blade substantially parallel to the longitudinal axis and the second position is with the blade substantially perpendicular to the longitudinal axis of the dispensed fibrous tape layer and means for translating the blade across and through the fibrous tape layer and adjacent the backing strip, the means translating the blade comprising means preventing serration of the backing strip.

23. An apparatus for applying a composite tape to a contoured mold comprising:
   a tape dispenser means for dispensing tape therefrom;
   dispenser translating means for translating the dispenser means over the mold in a desired pattern;

numerically controlled digital computer and program means for defining a preselected pattern of tape lengths on the mold surface for cutting the tape into lengths corresponding to respective spatial dimensions of a desired configuration while said translating means is translating said tape dispenser means across said mold surface;

control means for controlling the movement of said tape dispenser means such that said dispenser means is capable of following the contour of the mold surface as said dispenser means is translated across the mold surface, and means for actuating said control means independently of said program means upon translation of said dispenser means across the mold surface.

24. The apparatus according to claim 23 wherein said dispenser translating means comprises:
a gantry extending over the mold and gantry supporting track means adapted to be mounted adjacent the mold.

25. The apparatus according to claim 23 wherein said tape dispenser means includes a tape dispenser head for dispensing tape therefrom, and
wherein said sensor means for detecting the contour of said surface controls the vertical position of the head relative to the mold contour.

26. The apparatus according to claim 25 wherein said sensor means further comprises means for detecting the angular relationship of the dispenser head relative to the mold surface and for arcuate movement of said head relative to the mold surface such that said head is maintained substantially flat against said mold surface as said head moves across the surface.

27. The apparatus according to claim 23 wherein said tape dispenser means includes a tape dispenser head for dispensing tape therefrom, and wherein said sensor means for detecting the contour of said surface controls the angular relationship of the dispenser head relative to the mold surface to position said head substantially flat against the mold surface.

28. An apparatus for manufacturing a composite structure of the type adapted for applying composite tape in a desired pattern to a receiving surface, comprising:
structure defining a contoured mold surface;
first means for containing and dispensing the tape;
second means for translating the first means across the mold surface along said selected paths;
third means having operator programmable means for defining a preselected pattern of tape lengths on the mold surface by cutting the tape into lengths corresponding to the respective spatial dimensions of a desired configuration while said first means is being translated across the mold surface;
fourth means independent of the programmable third means responsive to elevational variances in the mold surface for causing the first means to track the contour of the mold surface during translation of the first means across the mold surface.

29. The apparatus according to claim 28 wherein said second means for translating the dispenser means over the mold comprises:
a gantry extending over the mold and gantry support track means adapted to be mounted adjacent the mold.

30. The apparatus according to claim 28 wherein said tape dispenser means includes a tape dispenser head for dispensing tape therefrom, and wherein said sensor means for detecting the contour of said surface controls the vertical position of the head relative to the mold surface.

31. The apparatus according to claim 30 wherein said sensor means further comprises means for detecting the angular relationship of the dispenser head relative to the mold surface and for arcuate movement of said head relative to the mold surface such that said head is maintained substantially flat against said mold surface as said head moves across the surface.

32. The apparatus according to claim 28, wherein said tape dispenser means includes a tape dispenser head for dispensing tape therefrom, and
wherein said sensor means for detecting the contour of said surface detects the angular relationship of the dispenser head relative to the mold surface and provides arcuate movement of said head relative to the mold surface such that said head is maintained substantially flat against said mold surface as said head moves across the surface.

33. An apparatus for manufacturing three dimensionally contoured composite structures comprised of layers of adherently bonded flexible tape formed in a desired pattern on a contoured receiving surface, said apparatus comprising:
(a) a support structure;
(b) first means movably mounted on said support structure including tape dispenser means for controllably dispensing said tape and cutter means for controllably cutting said tape;
(c) a bed member for supporting a mold having a contoured receiving surface;
(d) second means for selectively at least horizontally moving said first means with respect to said contoured receiving surface along selected paths, said first means being controllable to dispense said tape over said receiving surface as said first means is selectively moved with respect thereto;
(e) control means including:
(i) user programmable third means coupled to said second means and responsive to digital coordinate data for controlling said second means to selectively move said first means over the receiving surface to dispense said tape on said receiving surface and for controlling said cutter means to selectively cut said tape into lengths corresponding to the predetermined dimensions of said receiving surface as defined by said digital coordinate data while said first means is being moved across said receiving surface; and
(ii) automatic fourth means operating independently of said third means including sensor means for detecting the contour of said surface and means coupled to said second means for angularly positioning said first means with respect to said contour receiving surface.

* * * * *